US011942049B2

(12) United States Patent
Ikeyama

(10) Patent No.: US 11,942,049 B2
(45) Date of Patent: Mar. 26, 2024

(54) SIGNAL PROCESSING APPARATUS, SIGNAL PROCESSING METHOD, AND DISPLAY APPARATUS

(71) Applicant: Saturn Licensing LLC, New York, NY (US)

(72) Inventor: Tetsuo Ikeyama, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/568,319

(22) Filed: Jan. 4, 2022

(65) Prior Publication Data

US 2022/0130341 A1 Apr. 28, 2022

Related U.S. Application Data

(63) Continuation of application No. 16/771,485, filed as application No. PCT/JP2018/046119 on Dec. 14, 2018, now Pat. No. 11,222,606.

(30) Foreign Application Priority Data

Dec. 19, 2017 (JP) ................................. 2017-242425
Dec. 13, 2018 (JP) ................................. 2018-233115

(51) Int. Cl.
*G09G 3/30* (2006.01)
*G09G 3/34* (2006.01)
*G09G 3/36* (2006.01)

(52) U.S. Cl.
CPC ............... *G09G 3/342* (2013.01); *G09G 3/30* (2013.01); *G09G 3/3426* (2013.01); *G09G 3/36* (2013.01);

(Continued)

(58) Field of Classification Search
CPC ... G09G 2320/0247; G09G 2320/0626; G09G 2310/0251; G09G 3/3233;

(Continued)

(56) References Cited

U.S. PATENT DOCUMENTS 8,487,923 B2 7/2013 Kimura
8,907,879 B2 12/2014 Yoshida et al.

(Continued)

FOREIGN PATENT DOCUMENTS

CN 1637508 A 7/2005
CN 1711576 A 12/2005

(Continued)

OTHER PUBLICATIONS

International Search Report from Application No. PCT/JP2018/046119 dated Mar. 12, 2019, 3 pages.

(Continued)

*Primary Examiner* — Dismery Mercedes
(74) *Attorney, Agent, or Firm* — Lerner David LLP

(57) ABSTRACT

The present technology relates to a signal processing apparatus, a signal processing method, and a display apparatus that allow moving image blur to be more appropriately removed. Moving image blur can be removed by providing a detector detecting a moving image blur video including a video in which moving image blur is easily visible, from videos included in a video content on a basis of a feature amount of the video content. The present technology can be applied to, for example, a signal processing apparatus mounted in a display apparatus such as a liquid crystal display section or a self-luminous display apparatus.

18 Claims, 25 Drawing Sheets

(52) U.S. Cl.
CPC ............... *G09G 2310/0232* (2013.01); *G09G 2320/0247* (2013.01); *G09G 2320/0257* (2013.01); *G09G 2320/0626* (2013.01); *G09G 2320/103* (2013.01); *G09G 2360/145* (2013.01)

(58) Field of Classification Search
CPC ........... G09G 2320/0257; G09G 3/342; G09G 3/3241; G09G 2320/043; G09G 2320/066; G09G 2320/06; G09G 3/30; G09G 3/36; G09G 2360/145; G09G 3/3677; G09G 3/3426
See application file for complete search history.

(56) References Cited

U.S. PATENT DOCUMENTS

| | | | | |
|---|---|---|---|---|
| 9,293,088 | B2 | 3/2016 | Yoshida et al. | |
| 2004/0246242 | A1 | 12/2004 | Sasaki | |
| 2005/0062681 | A1 | 3/2005 | Honbo | |
| 2005/0259064 | A1* | 11/2005 | Sugino | G09G 3/342 345/102 |
| 2006/0146005 | A1 | 7/2006 | Baba et al. | |
| 2008/0007514 | A1* | 1/2008 | Tanaka | G09G 3/3648 345/102 |
| 2008/0165117 | A1 | 7/2008 | Jung et al. | |
| 2009/0002281 | A1* | 1/2009 | Okamoto | G09G 3/3241 345/76 |
| 2009/0109290 | A1 | 4/2009 | Ye et al. | |
| 2009/0146934 | A1* | 6/2009 | Hong | G09G 3/3648 345/87 |
| 2009/0161018 | A1 | 6/2009 | Kervec et al. | |
| 2009/0179995 | A1 | 7/2009 | Fukumoto et al. | |
| 2009/0207193 | A1 | 8/2009 | Isobe et al. | |
| 2010/0013866 | A1* | 1/2010 | Okabe | G02F 1/1336 345/102 |
| 2010/0053424 | A1 | 3/2010 | Kobayashi | |
| 2010/0085341 | A1 | 4/2010 | Hasegawa et al. | |
| 2010/0103089 | A1* | 4/2010 | Yoshida | G09G 3/3426 345/102 |
| 2010/0149167 | A1 | 6/2010 | Hasegawa et al. | |
| 2010/0171770 | A1 | 7/2010 | Inoue et al. | |
| 2011/0025726 | A1* | 2/2011 | Tatsumi | G09G 3/2025 345/690 |
| 2011/0063516 | A1 | 3/2011 | Muto | |
| 2012/0013652 | A1 | 1/2012 | Onishi et al. | |
| 2012/0075361 | A1* | 3/2012 | Kishi | G09G 3/3283 345/77 |
| 2012/0081419 | A1 | 4/2012 | Abe | |
| 2012/0092388 | A1 | 4/2012 | Kamon | |
| 2012/0147066 | A1* | 6/2012 | Fujiwara | G09G 3/3413 345/102 |
| 2012/0147291 | A1* | 6/2012 | Seo | G09G 3/342 349/62 |
| 2013/0021386 | A1* | 1/2013 | Min | G09G 3/3413 345/102 |
| 2015/0103250 | A1 | 4/2015 | Watanabe et al. | |
| 2016/0112627 | A1 | 4/2016 | Ono et al. | |
| 2016/0276549 | A1 | 9/2016 | Yamashita et al. | |
| 2016/0330374 | A1 | 11/2016 | Ilic et al. | |
| 2017/0293205 | A1* | 10/2017 | Iwata | G09G 5/02 |
| 2017/0345395 | A1* | 11/2017 | Shim | G09G 5/006 |
| 2019/0035986 | A1* | 1/2019 | Maeda | H01L 33/54 |
| 2019/0164492 | A1 | 5/2019 | Oh | |

FOREIGN PATENT DOCUMENTS

| | | | |
|---|---|---|---|
| CN | 1801304 | A | 7/2006 |
| CN | 101510390 | A | 8/2009 |
| CN | 101681593 | A | 3/2010 |
| CN | 101714328 | A | 5/2010 |
| CN | 101763820 | A | 6/2010 |
| CN | 101868816 | A | 10/2010 |
| JP | 2004233932 | A | 8/2004 |
| JP | 2004309592 | A | 11/2004 |
| JP | 2009192753 | A | 8/2009 |
| JP | 201055001 | A | 3/2010 |
| JP | 2010141370 | A | 6/2010 |
| JP | 2011075636 | A | 4/2011 |
| JP | 2016115497 | A | 6/2016 |
| WO | 2008153055 | A1 | 12/2008 |
| WO | 2011040011 | A1 | 4/2011 |
| WO | 2015068513 | A1 | 5/2015 |

OTHER PUBLICATIONS

Kurita, Taiichiro, "Time Response of Display and Moving Image Display Quality", NHK Science & Technology Research Laboratories, 2012, Vision Society of Japan, vol. 24, No. 4, pp. 154-163.
Search Report dated Dec. 9, 2022 from the Office Action for Chinese Application No. 201880080599.0 dated Jan. 11, 2023, 3 pages.

* cited by examiner

SIGNAL PROCESSING APPARATUS, SIGNAL PROCESSING METHOD, AND DISPLAY APPARATUS

CROSS REFERENCE TO RELATED APPLICATIONS

The present application is a continuation of U.S. patent application Ser. No. 16/771,485, filed on Jun. 10, 2020, which is a national phase entry under 35 U.S.C. § 371 of International Application No. PCT/JP2018/046119, filed on Dec. 14, 2018, which claims the priority from Japanese Patent Application No. 2017-242425, filed in the Japanese Patent Office on Dec. 19, 2017, and Japanese Patent Application No. 2018-233115, filed in the Japanese Patent Office on Dec. 13, 2018, the disclosures of which are hereby incorporated herein by reference.

TECHNICAL FIELD

The present technology relates to a signal processing apparatus, a signal processing method, and a display apparatus, and in particular, to a signal processing apparatus, a signal processing method, and a display apparatus that allow moving image blur to be more appropriately removed.

BACKGROUND ART

In recent years, liquid crystal displays (LCD) and organic EL displays (Organic Electro Luminescence Displays), which prevail as display devices for video apparatuses, are hold-type display apparatuses. There have been reports that display apparatuses of these types are subject to moving image blur due to human visual properties.

Various suggestions have been made as methods for removing moving image blur. For example, an OLED display apparatus has been suggested that mitigates moving image blur by switching a mode depending on a content to perform driving with a pixel off period (hereinafter referred to as impulse driving) within one frame when a video content is reproduced (see, for example, PTL 1).

SUMMARY

Technical Problem

However, the video content includes various videos such as fast moving videos and videos close to still images, and thus the driving method disclosed in PTL 1 involves performing the impulse driving on videos prevented from suffering moving image blur, and is thus insufficient as removal of moving image blur.

The present technology has been contrived in view of such circumstances, and an object of the present technology is to more appropriately remove moving image blur.

Solution to Problem

A signal processing apparatus according to an aspect of the present technology is a signal processing apparatus including a detection section detecting a moving image blur video including a video in which moving image blur is easily visible, from videos included in a video content on a basis of a feature amount of the video content.

A signal processing method according to an aspect of the present technology is a signal processing method for a signal processing apparatus, in which the signal processing apparatus includes a detection section detecting a moving image blur video including a video in which moving image blur is easily visible, from videos included in a video content on a basis of a feature amount of the video content.

In the signal processing apparatus and the signal processing method according to the aspect of the present technology, the moving image blur video corresponding to the video in which the moving image blur is easily visible is detected from the videos included in the video content on the basis of the feature amount of the video content.

A display apparatus according to an aspect of the present technology is a display apparatus including a display section displaying videos of a video content, a detection section detecting a moving image blur video including a video in which moving image blur is easily visible, from videos included in a video content on a basis of a feature amount of the video content, and a control section controlling driving of the display section on a basis of a detection result for the moving image blur video detected.

In the display apparatus according to the aspect of the present invention, the videos of the video content are displayed, the moving image blur video corresponding to the video in which moving image blur is easily visible is detected from the videos included in the video content on the basis of the feature amount of the video content, and driving of the display section is controlled on the basis of the detection result for the moving image blur video detected.

The signal processing apparatus or the display apparatus according to the aspect of the present technology may be an independent apparatus or an internal block included in one apparatus.

Advantageous Effect of Invention

According to the aspect of the present technology, moving image blur can be more appropriately removed.

Note that the effect described here is not necessarily limited and may be any of the effects described in the present disclosure.

DESCRIPTION OF EMBODIMENTS

Embodiments of the present technology will be described below with reference to the drawings. Note that description will be given in the following order.

1. First Embodiment
2. Second Embodiment
3. Third Embodiment
4. Fourth Embodiment
5. Fifth Embodiment
6. Configuration of Display Apparatus
7. Modified Example

1. First Embodiment

Configuration of Liquid Crystal Display Apparatus

Figure 1:
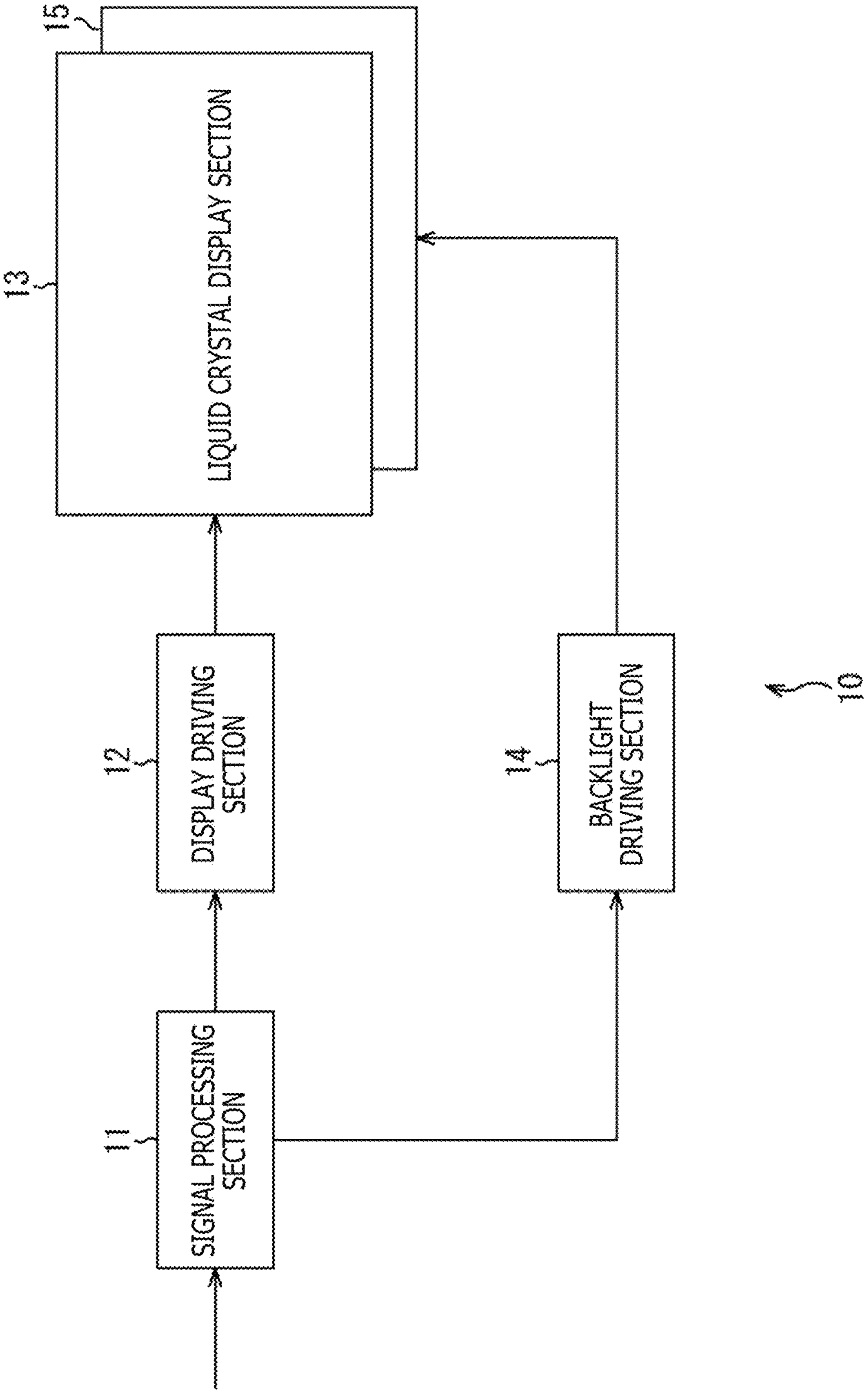
FIG. 1 is a block diagram illustrating an example of a configuration of an embodiment of a liquid crystal display apparatus to which the present technology is applied.

FIG. 1 is a block diagram illustrating an example of a configuration of an embodiment of a liquid crystal display apparatus to which the present technology is applied.

In FIG. 1, a liquid crystal display apparatus 10 includes a signal processing section 11, a display driving section 12, a liquid crystal display section 13, a backlight driving section 14, and a backlight 15.

The signal processing section 11 executes predetermined video processing on the basis of a video signal input to the signal processing section 11. In the video signal processing, a video signal for controlling driving of the liquid crystal display section 13 is generated and fed to the display driving section 12. Additionally, in the video signal processing, a driving control signal (BL driving control signal) for controlling driving of the backlight 15 is generated and fed to the backlight driving section 14.

The display driving section 12 drives the liquid crystal display section 13 on the basis of the video signal fed from the signal processing section 11. The liquid crystal display section 13 is a display panel including pixels two-dimensionally arranged and each including a liquid crystal element and TFT (Thin Film Transistor) element. The liquid crystal display section 13 provides display by modulating light emitted from the backlight 15 in accordance with driving from the display driving section 12.

Here, the liquid crystal display section 13 includes, for example, two transparent substrates formed of glass or the like and between which a liquid crystal material is sealed. A portion of each of the transparent substrates that faces the liquid crystal material is provided with a transparent electrode formed of, for example, ITO (Indium Tin Oxide), and the transparent electrode forms a pixel along with the liquid crystal material. Note that, in the liquid crystal display section 13, each pixel includes, for example, three subpixels in red (R), green (G), and blue (B).

The backlight driving section 14 drives the backlight 15 on the basis of the driving control signal (BL driving control signal) fed from the signal processing section 11. The backlight 15 emits light generated by a plurality of light emitting elements, to the liquid crystal display section 13 in accordance with driving from the backlight driving section 14. Note that, for example, LEDs (light Emitting Diodes) can be used as the light emitting elements.

Configuration of Self-Luminous Display Apparatus

Figure 2:
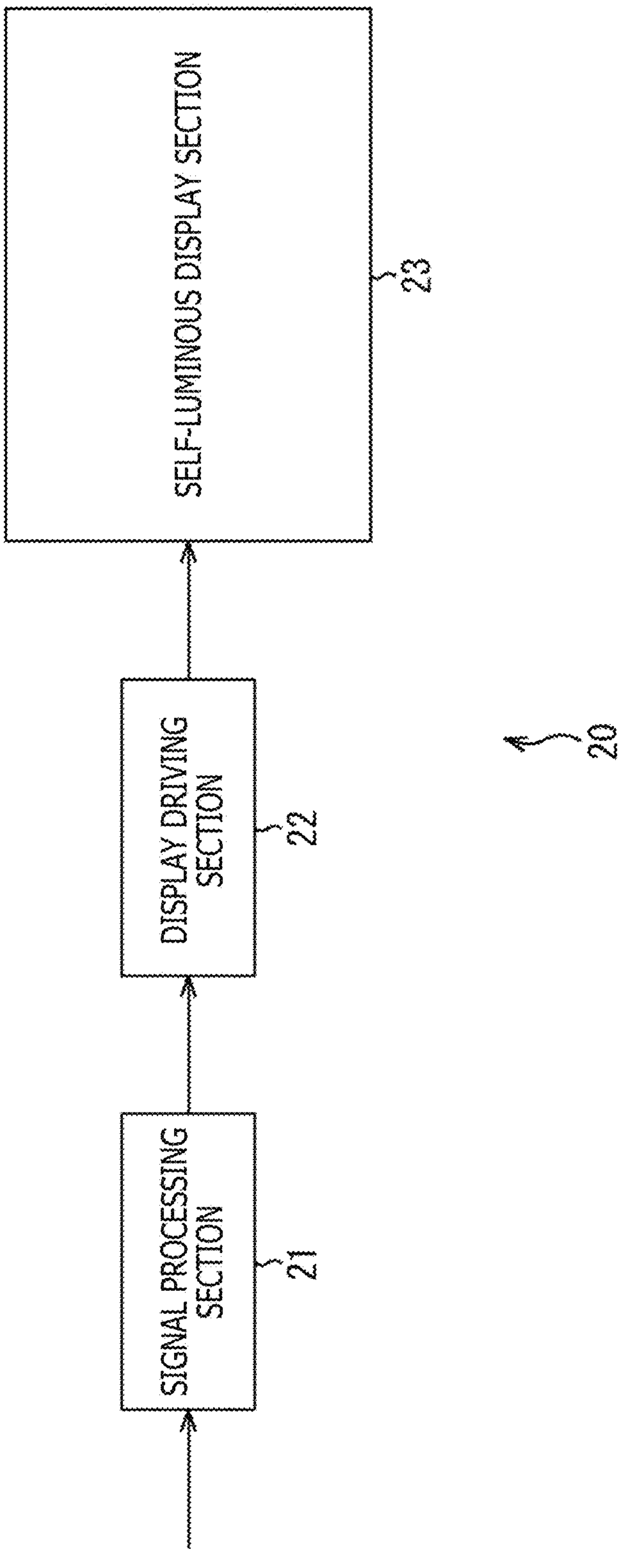
FIG. 2 is a block diagram illustrating an example of a configuration of an embodiment of a self-luminous display apparatus to which the present technology is applied.

FIG. 2 is a block diagram illustrating an example of a configuration of an embodiment of a self-luminous display apparatus to which the present technology is applied.

In FIG. 2, a self-luminous display apparatus 20 includes a signal processing section 21, a display driving section 22, and a self-luminous display section 23.

The signal processing section 21 executes predetermined video signal processing on the basis of a video signal input to the signal processing section 21. In the video signal processing, a video signal for controlling driving of the self-luminous display section 23 is generated and fed to the display driving section 22.

The display driving section 22 drives the self-luminous display section 23 on the basis of the video signal fed from the signal processing section 21. The self-luminous display section 23 is a display panel including pixels two-dimensionally arranged and each including a self-luminous element. The self-luminous display section 23 provides display in accordance with driving from the display driving section 22.

Here, the self-luminous display section 23 is, for example, a self-luminous display panel such as an organic EL display section (OLED display section) using organic electroluminescence (organic EL). Specifically, in a case where an organic EL display section (OLED display section) is adopted as the self-luminous display section 23, the self-luminous display apparatus 20 corresponds to an organic EL display apparatus (OLED display apparatus).

An OLED (Organic Light Emitting Diode) is a light emitting element including an organic light emitting material between a negative electrode and a positive electrode, and OLEDs form pixels two-dimensionally arranged in the organic EL display section (OLED display section). The OLED included in the pixel is driven in accordance with a driving control signal (OLED driving control signal) generated by video signal processing. Note that, in the self-luminous display section 23, each pixel includes, for example, four subpixels in red (R), green (G), blue (B), and white (W).

Incidentally, the above-described liquid crystal display apparatus 10 (FIG. 1) and the self-luminous display apparatus 20 (FIG. 2) are hold-type display apparatuses. In the hold-type display apparatuses, in principle, the pixels two-dimensionally arranged in the display section provide display at the same luminance during one frame (hold-type display). Thus, there have been reports that display apparatuses of this type are subject to moving image blur (also referred to as hold blur) due to human visual properties.

In contrast, in the liquid crystal display apparatus 10, by providing a period when the backlight 15 is off during one frame to cause pseudo impulse driving, moving image blur can be removed. On the other hand, in the self-luminous display apparatus 20, by providing a pixel off period during one frame to cause pseudo impulse driving, moving image blur can be removed.

Such an improvement method is disclosed in, for example, NPL 1 below.

NPL 1: Taiichiro Kurita, Time Response of Display and Moving Image Display Quality, NHK Science & Technology Research Laboratories, Vision Society of Japan, Vol. 24, No. 4, 154-163, 2012.

However, this improvement method reduces luminance to degrade image quality due to the provision of the off period. In contrast, degradation of image quality can be suppressed by increasing a current supplied to the backlight 15 for the liquid crystal display section 13 and to the self-luminous elements included in the self-luminous display section 23, but power consumption or temperature may be increased or shortening of device life may be fostered.

Note that, as described above, the OLED display apparatus disclosed in PTL 1 switches a mode depending on a content to perform impulse driving with a pixel off period during one frame when a video content is reproduced.

However, the video content includes various videos such as fast moving videos and videos close to still images, and thus the above-described driving method involves performing the impulse driving on videos in which no moving image blur occurs, and is thus insufficient as removal of moving image blur.

Thus, the present technology causes the impulse driving to be performed when moving image blur is easily visible, allowing moving image blur to be more appropriately removed.

Figure 3:
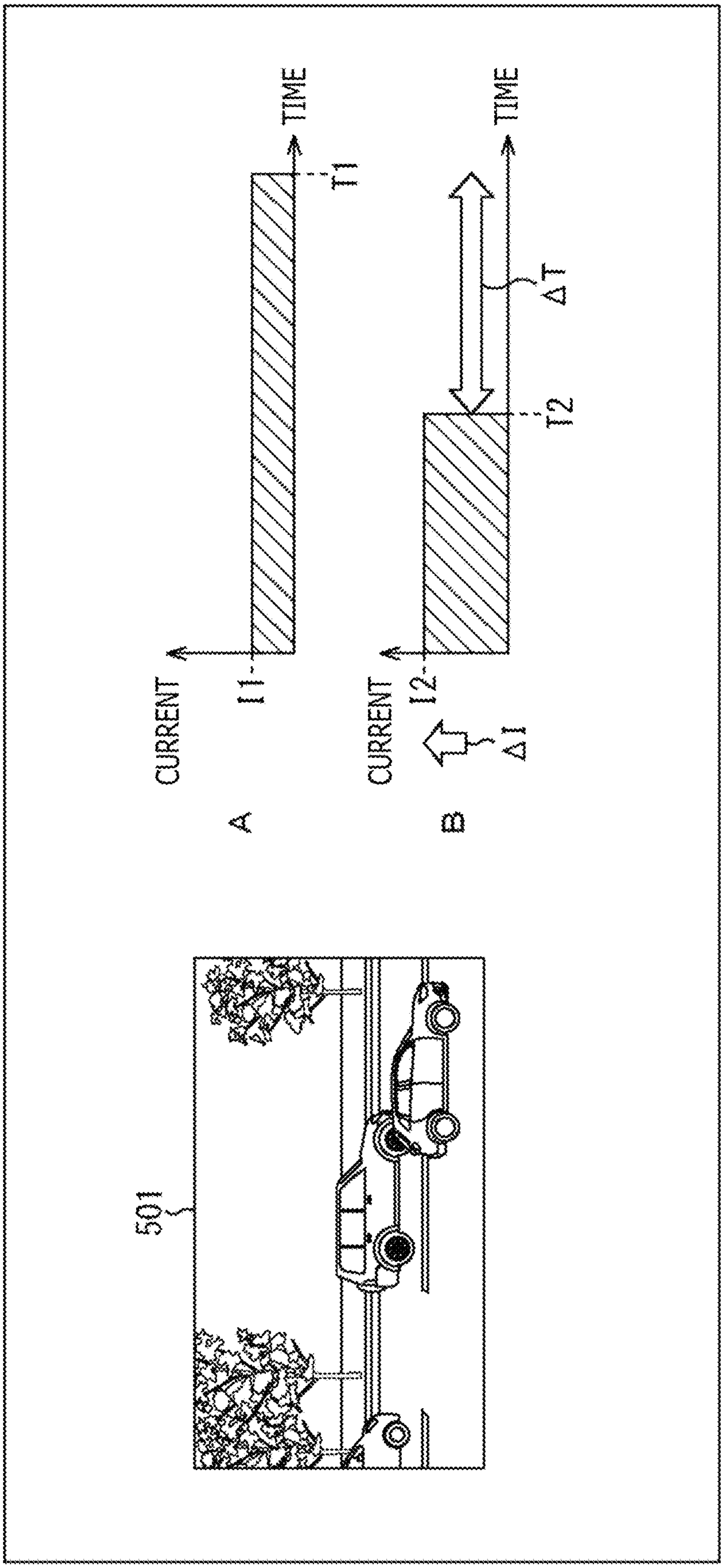
FIG. 3 is a diagram illustrating the concept of impulse driving to which the present technology is applied.

FIG. 3 is a diagram illustrating the concept of the impulse driving to which the present technology is applied.

In FIG. 3, a video 501 is a video displayed on the liquid crystal display section 13 of the liquid crystal display apparatus 10. Cars included in the video 501 are traveling in a direction from a left side toward a right side in the figure.

Here, moving image blur may occur while an object in the video is moving. Accordingly, in a scene like a video 501 in which cars are traveling, moving image blur is easily visible, and thus instead of normal driving based on a driving method in A of FIG. 3, a driving method in B of FIG. 3 is used to perform the impulse driving.

Specifically, in the driving method in A of FIG. 3, driving is performed in which light emitting elements (for example, the LEDs) in the backlight 15 are kept on at a constant current I1 and during an on period T1. On the other hand, in the driving method in B of FIG. 3, driving is performed in which light emitting elements (for example, the LEDs) in the backlight 15 are kept on at a constant current I2 (I2>I1) and during an on period T2 (T2<T1).

By switching from the driving method in A of FIG. 3 to the driving method in B of FIG. 3 in a scene like the video 501 in which moving image blur is easily visible as described above, an off period is extended by a decrease from the on period T1 to the on period T2 (ΔT (T1−T2)), thus allowing moving image blur to be removed. Additionally, the switching of the driving method allows luminance to be maintained in spite of a shortened on period by the increase in current from I1 to I2 (increase in current by ΔI (I2−I1)).

In other words, in the present technology, in a scene like the video 501 in which moving image blur is easily visible, what is called impulse-type driving with brightness maintained (impulse driving) is performed to remove moving image blur, thus allowing provision of optimal image quality compatible with a displayed video.

Note that FIG. 3 has been described on the assumption that the video 501 is a video displayed on the liquid crystal display section 13 of the liquid crystal display apparatus 10 (FIG. 1) but that, also for a video displayed on the self-luminous display section 23 of the self-luminous display apparatus 20 (FIG. 2), in a scene in which moving image blur is easily visible, the driving method can be switched from the normal driving based on the driving method in A of FIG. 3 to the impulse driving based on the driving method in B of FIG. 3.

However, in the self-luminous display apparatus 20, during execution of the normal driving based on the driving method in A of FIG. 3 or the impulse driving based on the driving method in B of FIG. 3, the on period and current value for the self-luminous elements (for example, the OLEDs) in the self-luminous display section 23 are controlled.

Configuration of Signal Processing Section

Figure 4:
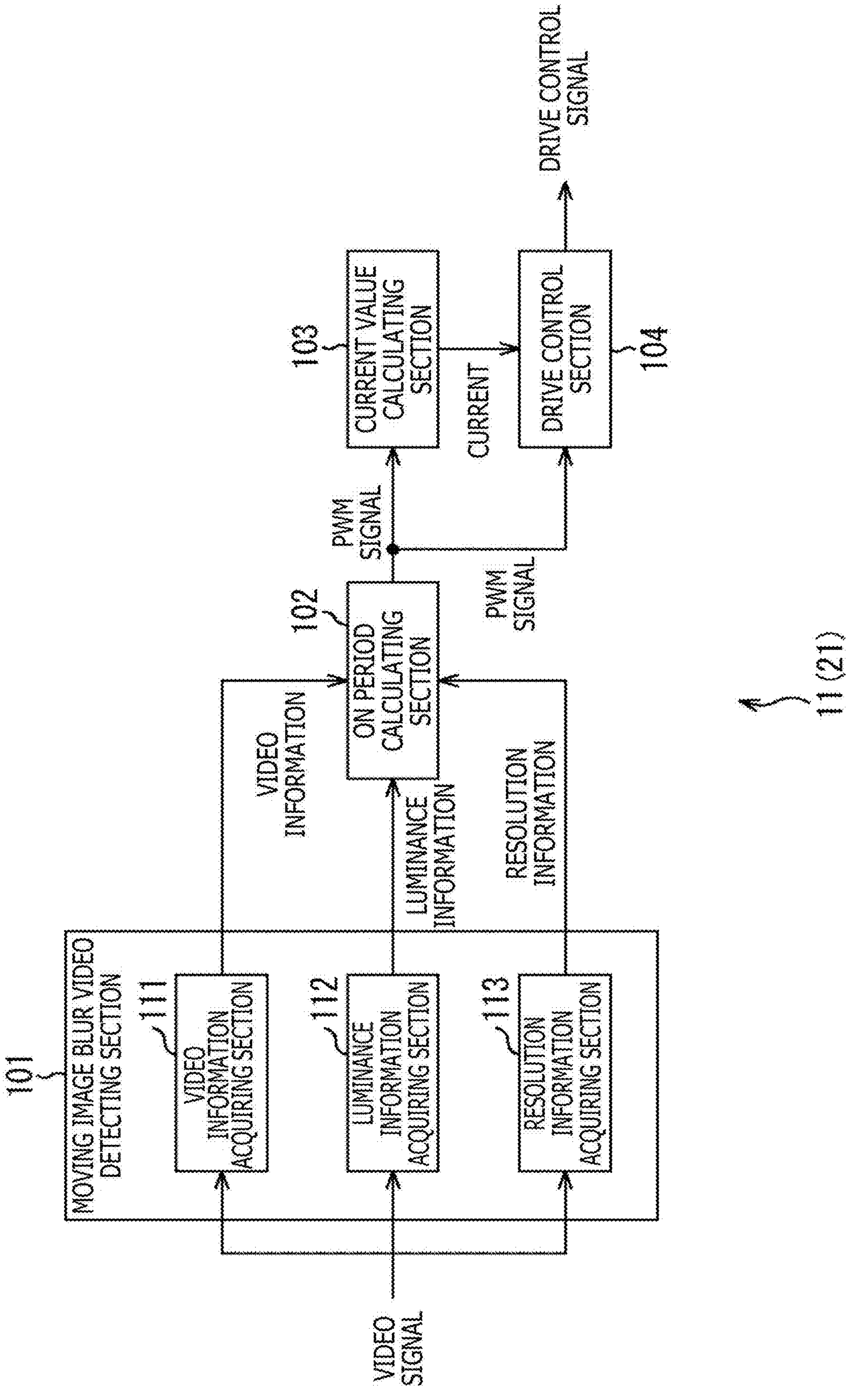
FIG. 4 is a block diagram illustrating an example of a configuration of a signal processing section according to a first embodiment.

FIG. 4 is a block diagram illustrating an example of a configuration of the signal processing section according to the first embodiment.

In FIG. 4, the signal processing section 11 in FIG. 1 includes a moving image blur video detecting section 101, an on period calculating section 102, a current value calculating section 103, and a driving control section 104.

The moving image blur video detecting section 101 detects a video in which moving image blur is easily visible (hereinafter referred to as a moving image blur video) from videos included in a video content on the basis of a video signal for the video content input to the moving image blur video detecting section 101, and feeds a detection result to the on period calculating section 102.

The moving image blur video detecting section 101 includes a video information acquiring section 111, a luminance information acquiring section 112, and a resolution information acquiring section 113.

The video information acquiring section 111 executes video information acquiring processing on the video signal for the video content, and feeds a corresponding processing result to the on period calculating section 102 as video information.

Here, moving image blur do not occur unless an object displayed as a video moves, and thus, in video information acquisition processing, a moving image amount is detected as an indicator representing movement of the object in the video.

For a detection method for the moving image amount, detection can be achieved using a difference in luminance of each pixel between video frames or a moving vector amount of each pixel or the object. Furthermore, the moving image amount may be detected using detection of captions in which moving image blur is typically easily visible or detection of pan (panning) of a camera.

The luminance information acquiring section 112 executes luminance information acquisition processing on a video signal for a video content, and feeds a corresponding processing result to the on period calculating section 102 as luminance information.

Here, for example, in a case where driving is performed on a video with a peak luminance focused on, it is sometimes better that switching to the impulse driving is avoided, and in this luminance information acquisition processing, luminance information such as peak luminance information can be detected. Note that details of an example of driving with the peak luminance information taken into account will be described below with reference to FIG. 5 and FIG. 6.

The resolution information acquiring section 113 executes resolution information acquisition processing on the video signal for the video content, and feeds a corresponding processing result to the on period calculating section 102 as resolution information.

Here, moving image blur occur at edge portions of the video and not at flat portions, and thus, for example, in the resolution information acquisition processing, the spatial resolution of the video is analyzed to detect an edge amount as an indicator representing edge portions included in the video.

For a detection method for the edge amount (edge portions), for example, detection can be achieved by, for example, a method of using a plurality of bandpass filters that pass only specific frequencies.

Note that the video information, luminance information, and resolution information detected by the moving image blur video detecting section 101 are feature amounts of the video content (feature amounts obtained from the video content) and that a moving image blur video is detected on the basis of the feature amounts. Additionally, FIG. 4 illustrates a configuration in which one moving image blur video detecting section 101 is provided. However, a plurality of the moving image blur video detecting sections 101 may be provided to perform detection in each specific portion (region) of the video of the video content.

The on period calculating section 102 is fed with the video information from the video information acquiring section 111, the luminance information from the luminance information acquiring section 112, and the resolution information from the resolution information acquiring section 113.

The on period calculating section 102 computes the on period for the light emitting elements (for example, the LEDs) in the backlight 15 on the basis of the video information, luminance information, and resolution information fed from the acquiring sections of the moving image blur video detecting section 101 (detection results for a moving image blur video), and feeds each of the current value calculating section 103 and the driving control section 104 with a PWM signal corresponding to a calculation result.

Note that, in this case, a PWM (Pulse Width Modulation) driving scheme in which turn-on and turn-off are repeated is adopted as a driving scheme for the light emitting elements such as LEDs used in the backlight 15 and thus that PWM signals are output that correspond to the on period for the light emitting elements such as LEDs.

The current value calculating section 103 computes a current value on the basis of the relationship between the PWM signal (on period fed from the on period calculating section 102 and a luminance to be displayed, and feeds a corresponding calculation result to the driving control section 104. Here, the current value, the on period, and the luminance have a relationship as represented by Formula (1) below.

$$\text{Luminance}=f(\text{current value})\times\text{on period} \quad (1)$$

Here, in Formula (1), f (current value) is a function for an increase in luminance associated an increase in current value. For example, in the liquid crystal display apparatus 10, for which the backlight 15 using LEDS as the light emitting elements is adopted, the relationship between the current and brightness does not vary linearly. This is due to reduced light emission efficiency caused by self-heating of the LEDs included in the backlight 15, and f (current value) in Formula (1) needs to be a function for which this property is taken into account.

The driving control section 104 is fed with the PWM signal (on period) from the on period calculating section 102 and the current value from the current value calculating section 103. The driving control section 104 generates a driving control signal (BL driving control signal) for turning on the backlight 15 and feeds the driving control signal to the backlight driving section 14 (FIG. 1) on the basis of the PWM signal (on period) and the current value.

Thus, the backlight driving section 14 drives the backlight 15 on the basis of the driving control signal (BL driving control signal) from the driving control section 104.

Note that, with reference to FIG. 4, the configuration of the signal processing section 11 included in the liquid crystal display apparatus 10 (FIG. 1) has been described as a representative but that the signal processing section 21 included in the self-luminous display apparatus 20 (FIG. 2) can be similarly configured.

However, in the self-luminous display apparatus 20, in a case where the configuration illustrated in FIG. 4 is adopted for the signal processing section 21, the self-luminous display section 23 succeeding the signal processing section 21 is driven, and thus the on period calculating section 102 computes the on period for the self-luminous elements (for example, the OLEDs) in the self-luminous display section 23. Additionally, the driving control section 104 generates a driving control signal (OLED driving control signal) for turning on the self-luminous elements (for example, the OLEDs) in the self-luminous display section 23 on the basis of the PWM signal (on period) and the current value.

Example of Driving with Peak Luminance Information Taken into Account

Incidentally, for example, in the liquid crystal display apparatus 10, the backlight 15 can be configured such that what is called a direct backlight is adopted to provide two-dimensionally arranged plurality of partial light emitting sections. The partial light emitting sections can include, for example, a plurality of light emitting elements such as LEDs. Additionally, each of the partial light emitting sections can independently emit light at a set luminance.

In the liquid crystal display apparatus 10 with the backlight 15 of this type, for each partial light emitting section, when the partial light emitting section is driven, driving is performed in which surplus power for a dark portion is used for a bright portion to increase the luminance.

Figure 5:
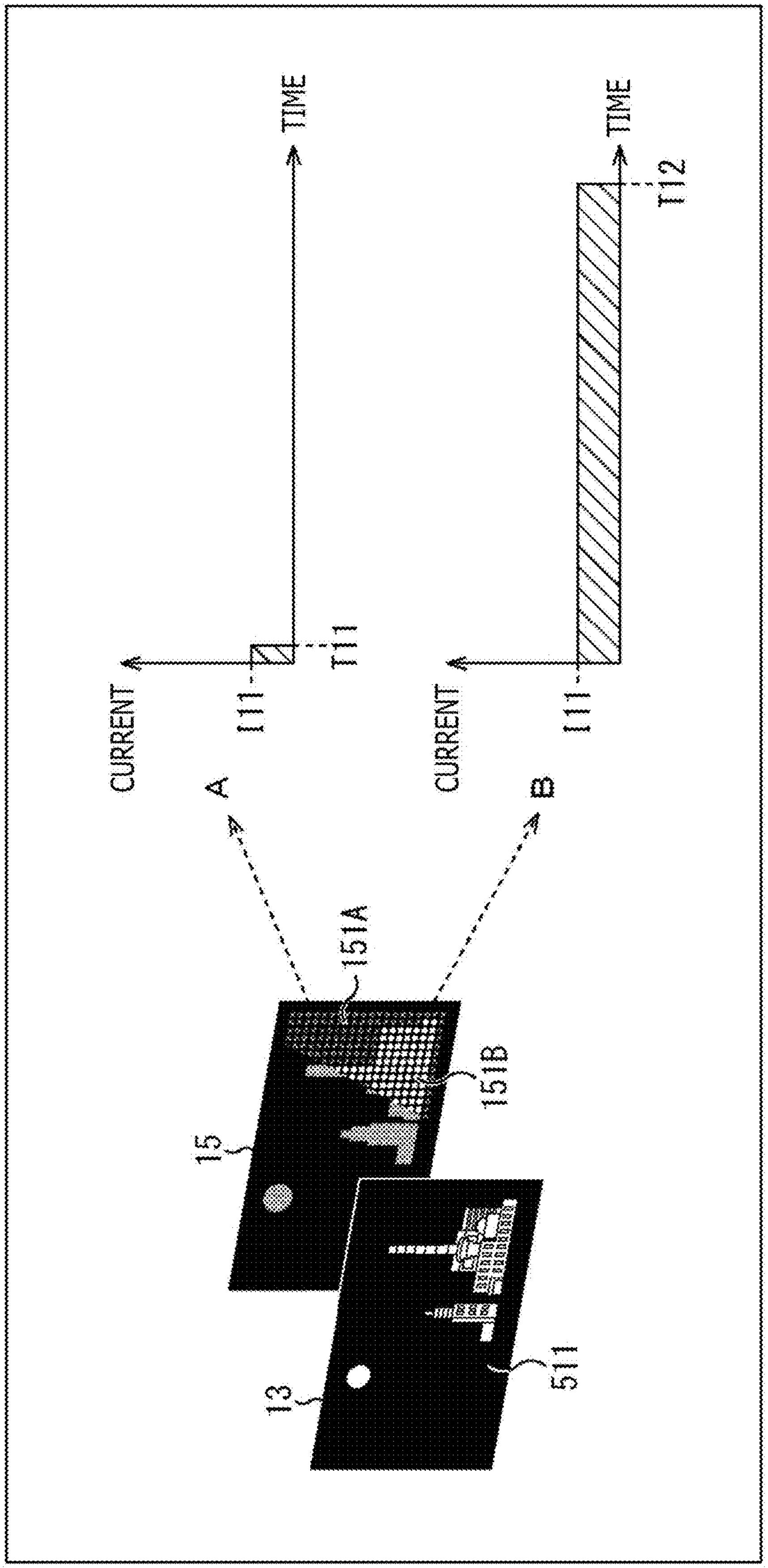
FIG. 5 is a diagram illustrating an example of partial driving of a backlight of the liquid crystal display apparatus.

Specifically, as illustrated in FIG. 5, when a video 511 is displayed on the liquid crystal display section 13, in the backlight 15, (each of the LEDs in) a partial light emitting section 151B for the bright portion included in a partial light emitting section 151 is turned on, whereas (each of the LEDs in) a partial light emitting section 151A for the dark portion also included in a partial light emitting section 151 is turned off.

A of FIG. 5 illustrates a driving method for the partial light emitting section 151A for the dark portion. On the other hand, B of FIG. 5 illustrates a driving method for the partial light emitting section 151B for the bright portion. Here, a comparison between the driving method in B of FIG. 5 and the driving method in A of FIG. 5 indicates that the driving methods are the same in that a constant current I11 is used for driving but that an on period T12 in the driving method in B of FIG. 5 (T12>T11) is longer than an on period T11 in the driving method in A of FIG. 5 (the on period T11 is close to zero). In this manner, the lighting amount of the LEDs is controlled according to the brightness of the video 511.

Figure 6:
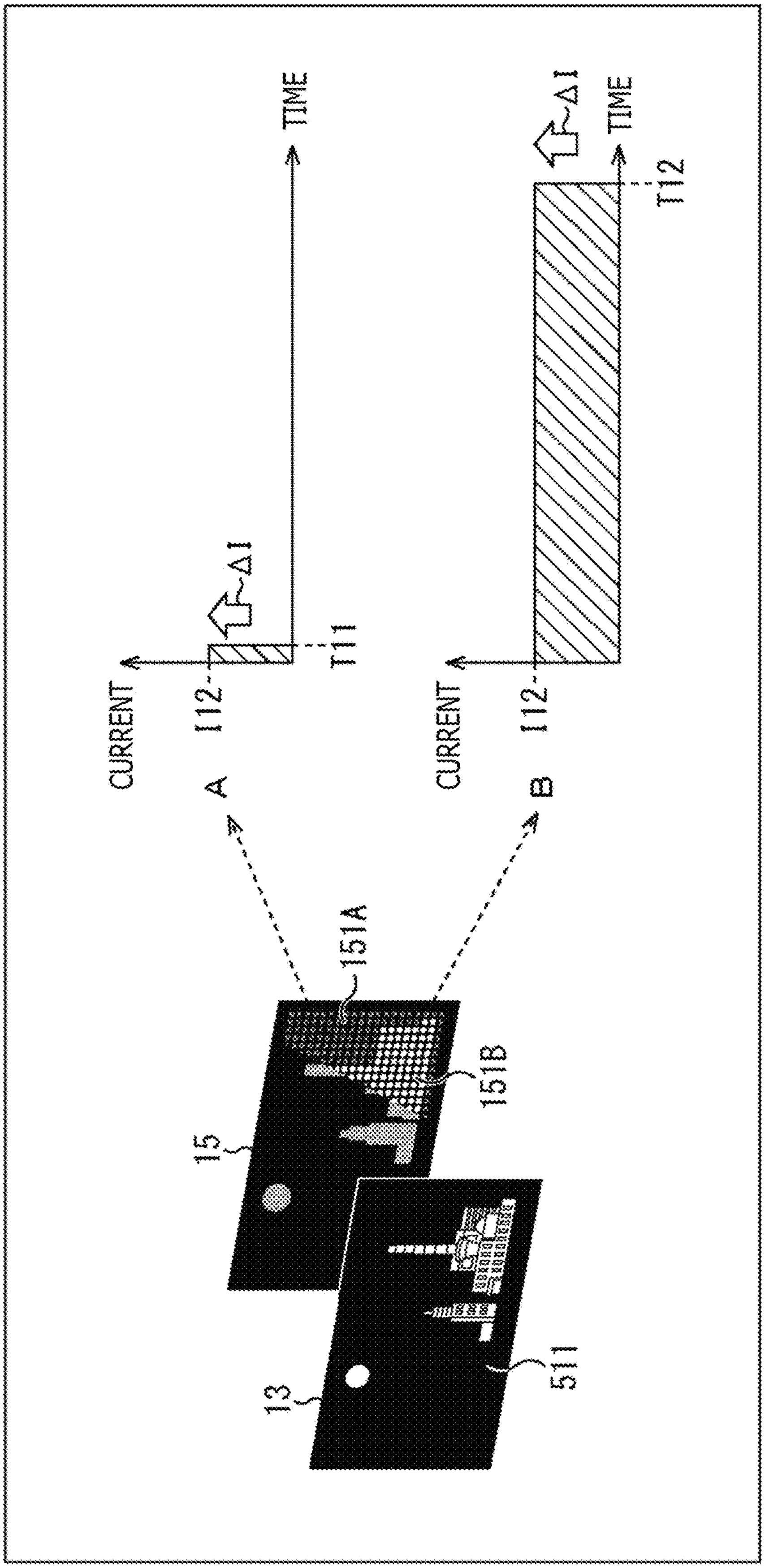
FIG. 6 is a diagram illustrating an example in which brightness is improved when the backlight of the liquid crystal display apparatus is partially driven.

Additionally, a driving method in FIG. 6 is the same as the driving method in FIG. 5 in that, in the backlight 15, (each of the LEDs in) the partial light emitting section 151B for the bright portion is turned on, whereas (each of the LEDs in) the partial light emitting section 151A for the dark portion is turned off. Here, a comparison between the driving methods in A and B of FIG. 6 and the driving methods in A and B of FIG. 5 indicates that the on periods T11 and T12 are the same but that the current I12 (I12>I11) is larger in the driving methods in A and B of FIG. 6 than in the driving methods in A and B of FIG. 5 (the current I12 in the driving methods in A and B of FIG. 6 is larger than the current I12 in the driving methods in A and B of FIG. 5 by ΔI (I12−I11)).

Specifically, in the driving methods illustrated in FIG. 6, surplus power for the partial light emitting section 151A for the dark portion is used for the partial light emitting section 151B for the bright portion to increase a peak luminance of the video 511. In the video 511 with the peak luminance increased, the partial light emitting section 151B for the bright portion has a higher current, thus hindering implementation of the impulse driving with brightness maintained as illustrated in FIG. 3.

Thus, the present technology enables control in which, in a case where the video (video content) focuses on the peak luminance (brightness), switching to the impulse driving is avoided even in a case where, for example, the object in the video is moving and where the video (video content) includes many edge portions (even in a case where a moving image blur video is detected) as in the driving method illustrated in FIG. 6.

Flow of Impulse Driving Determination Processing

Now, with reference to a flowchart in FIG. 7, a flow of impulse driving determination processing executed by the signal processing section 11 will be described.

In step S11, the signal processing section 11 compares a preset threshold for moving image amount determination with the moving image amount in a target video included in the video information acquired by the video information acquiring section 111 to determine whether or not the moving image amount in the target video is large.

In step S11, in a case where the moving image amount is smaller than the threshold, that is, in a case where the moving image amount is determined to be small, for example, the target video is a still image, and thus the processing is advanced to step S14. In step S14, the signal processing section 11 controls the backlight driving section 14 to cause the backlight 15 to be driven on the basis of the normal driving.

Here, the normal driving is the driving method illustrated in A of FIG. 3 described above and involving the turn-on and -off timings for (the light emitting elements such as LEDs in) the backlight 15 in synchronization with drawing on the liquid crystal display section 13 in accordance with the PWM driving scheme. Thus, a PWM period is 60 Hz, 120 Hz, 240 Hz, or the like, which is an integral multiple of a frame frequency of a video signal.

Additionally, in step S11, in a case where the moving image amount is larger than the threshold, that is, in a case where the moving image amount is determined to be large, for example, the processing is advanced to step S12. In step S12, a preset threshold for edge portion determination is compared with (the amount of edge portions indicated by) the edge amount in the target video included in the resolution information acquired by the resolution information acquiring section 113 to determine whether or not the target video includes many edge portions.

In step S12, in a case where the edge amount is smaller than the threshold, that is, in a case where the video includes few edge portions, the processing is advanced to step S14, and the signal processing section 11 causes the backlight 15 to be driven on the basis of the normal driving (S14).

Additionally, in step S12, in a case where the edge amount is larger than the threshold, that is, in a case where the video includes many edge portions, the processing is advanced to step S13. In step S13, the signal processing section 11 determines whether or not to perform the driving focuses on the brightness. Here, whether or not to perform the driving with the brightness focused on is determined depending on whether or not to perform the driving illustrated in FIG. 6 (driving for increasing the peak luminance) or not.

In step S13, in a case where the driving with the brightness focused on is determined to be performed, the processing is advanced to step S14, and the signal processing section 11 causes the backlight 15 to be driven on the basis of the normal driving (S14).

Here, in a case where the driving illustrated in FIG. 6 (driving for increasing the peak luminance) is performed, the partial light emitting section 151B for the bright portion has a high current, hindering the implementation of the impulse driving with brightness maintained, and thus the normal driving is performed as described above.

Additionally, in step S13, in a case where the driving with the brightness not focused on is determined to be performed, the processing is advanced to step S15. In step S15, the signal processing section 11 causes the backlight 15 to be driven on the basis of the impulse driving.

Here, the impulse driving (impulse type driving) is the driving method illustrated in B of FIG. 3 described above, and involves a shorter on period (increases the off period in one frame of a video) and a larger current for (the light emitting elements such as LEDs in) the backlight 15 than the normal driving. Accordingly, in a scene in which moving image blur is easily visible, moving image blur can be removed with the luminance maintained.

The flow of the impulse driving determination processing has been described. Note that the order of the steps of determination processing (S11, S12, and S13) in the impulse driving determination processing is optional and that not all the steps of determination processing need to be executed. Additionally, the threshold for determination can be set to an appropriate value according to various conditions.

Figure 7:
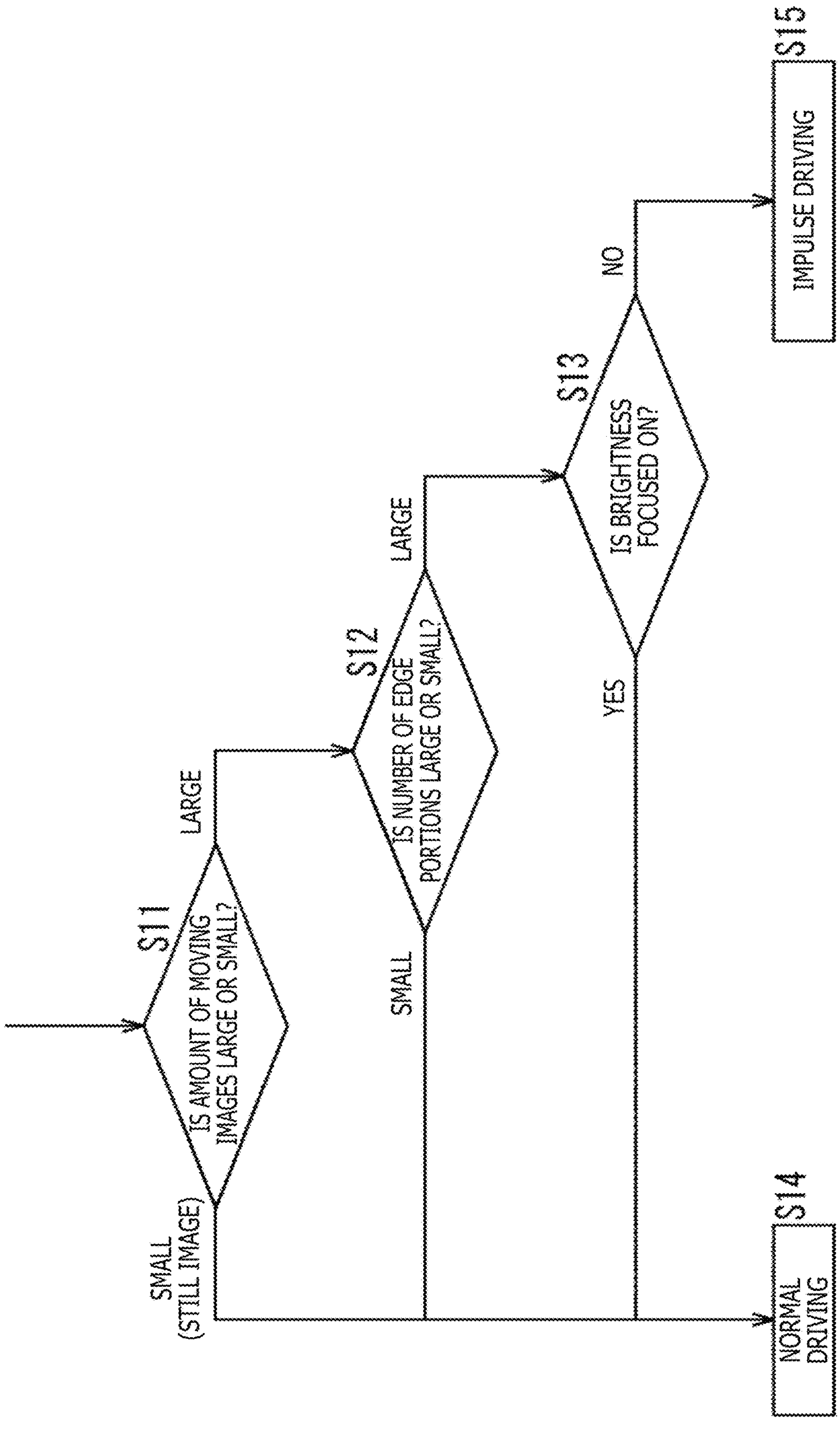
FIG. 7 is a flowchart illustrating a flow of impulse driving determination processing.

Note that the impulse driving determination processing has been described, with reference to FIG. 7, as being executed by the signal processing section 11 (FIG. 1) of the liquid crystal display apparatus 10 but may be executed by the signal processing section 21 (FIG. 2) of the self-luminous display apparatus 20. However, in a case where the signal processing section 21 executes the impulse driving determination processing, the target of the driving control is (the self-luminous elements such as OLEDs in) the self-luminous display section 23.

Additionally, in the above description, the feature amounts in the video content, that is, the video information, luminance information, and resolution information are illustrated as the feature amounts obtained from the video content. However, any other information may be used as long as the information enables moving image blur is to be detected. Furthermore, in detection of a moving image blur video, not all of the video information, luminance information, and resolution information needs to be used, and it is sufficient to use at least one of the pieces of information.

Additionally, moving image blur is likely to occur in, for example, a video content captured at a low frame rate of 60 Hz or the like. For such a video content including moving image blur (videos with dull edges), a time resolution is not improved even in a case where the impulse driving is performed in a case where a large moving image amount is detected. Thus, in the impulse driving determination processing, execution of the impulse driving can be avoided in a case where the video content is detected, on the basis of the video information and the resolution information. This avoids execution of unnecessary impulse driving, allowing prevention of an excessive increase in power or heat and suppression of a reduction in device life.

As described above, in the first embodiment, the feature amounts such as the video information, the luminance information, and the resolution information are detected as the feature amounts of the video content, and on the basis of the detection results for the feature amounts, control is performed on the driving of the light emitting section such as the backlight 15 (for example, the LEDs) of the liquid crystal display section 13 or the self-luminous elements (for example, the OLEDs) in the self-luminous display section 23.

Thus, according to the degree at which moving image blur is easily visible, control can be performed on the on period and current value for the backlight 15 of the liquid crystal display section 13 and the pixel on period (on period for the self-luminous elements) and current value for the self-luminous display section 23, allowing moving image blur (hold blur) to be removed. As a result, optimal image quality compatible with the displayed video can be provided.

2. Second Embodiment

In a second embodiment, a video included in a video content is divided into several regions, and for each of the regions resulting from the division, the driving of the light emitting section (on period and current value) is controlled using a driving method similar to the driving method in the first embodiment described above. Specifically, the simultaneous occurrence of moving image blur over the entire region is rare, and by performing the impulse driving on the region of moving objects, power consumption and shortening of the device life can be reduced.

Configuration of Signal Processing Section

Figure 8:
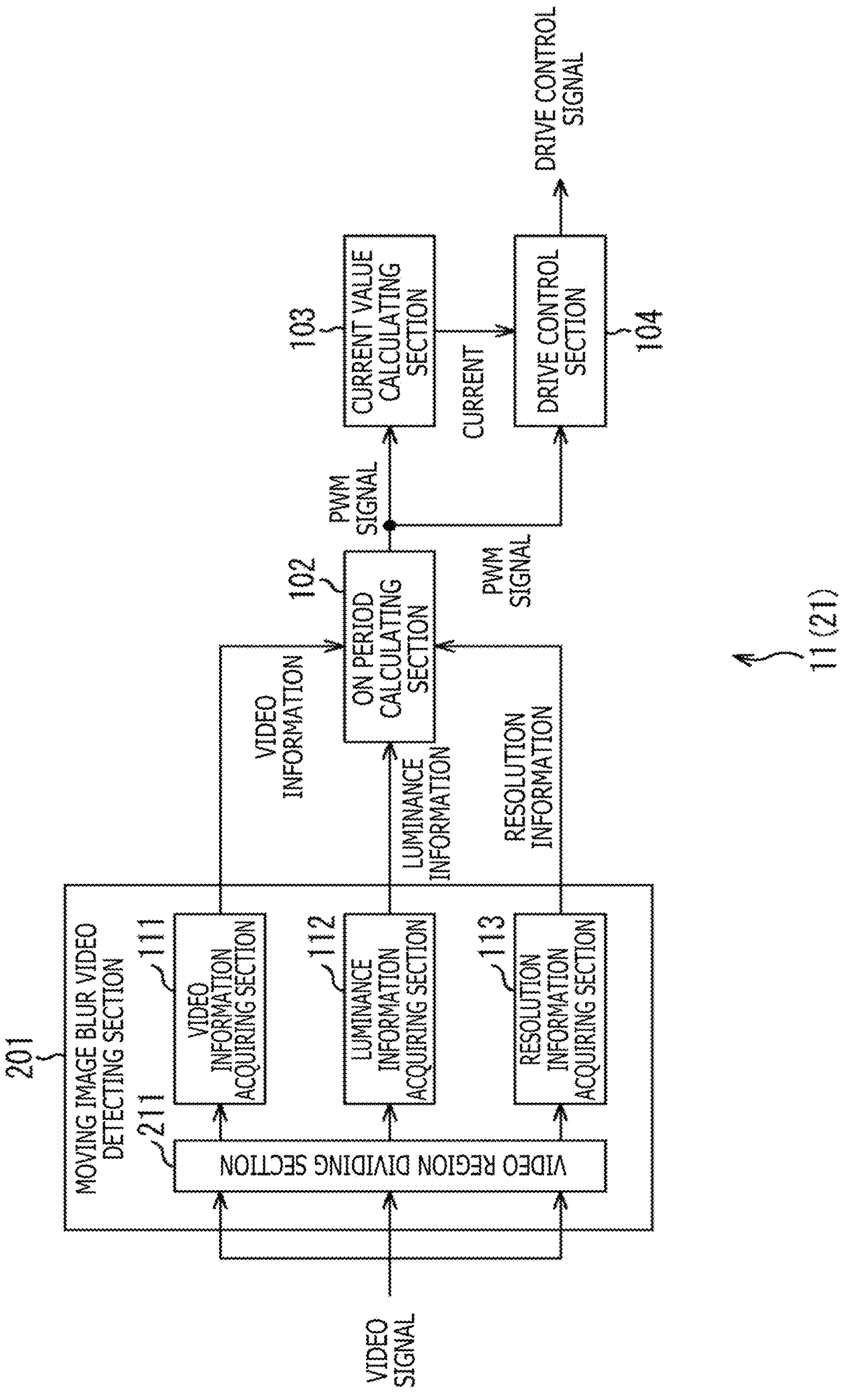
FIG. 8 is a block diagram illustrating an example of a configuration of a signal processing section according to a second embodiment.

FIG. 8 is a block diagram illustrating an example of a configuration of a signal processing section according to the second embodiment.

In FIG. 8, the signal processing section 11 includes a moving image blur video detecting section 201, the on period calculating section 102, the current value calculating section 103, and the driving control section 104.

That is, compared to the configuration of the signal processing section 11 in FIG. 4, the signal processing section 11 in FIG. 8 includes the moving image blur video detecting section 201 instead of the moving image blur video detecting section 101.

The moving image blur video detecting section 201 includes the video information acquiring section 111, the luminance information acquiring section 112, the resolution information acquiring section 113, and a video region dividing section 211.

The video region dividing section 211 divides a video included in a video content in a plurality of regions, on the basis of a video signal input to the video region dividing section 211, and feeds the video information acquiring section 111, the luminance information acquiring section 112, and the resolution information acquiring section 113 with video signals for videos resulting from the division.

The video information acquiring section 111 executes video information acquisition processing on the video signal for each division region fed from the video region dividing section 211, and feeds a corresponding processing result to the on period calculating section 102 as video information (for example, the moving image amount).

The luminance information acquiring section 112 executes luminance information acquisition processing on the video signal for each division region fed from the video region dividing section 211, and feeds a corresponding processing result to the on period calculating section 102 as luminance information (for example, the peak luminance).

The resolution information acquiring section 113 executes resolution information acquisition processing on the video signal for each division region fed from the video region dividing section 211, and feeds a corresponding processing result to the on period calculating section 102 as resolution information (for example, the edge amount).

The video information, luminance information, and resolution information thus detected by the moving image blur video detecting section 201 are the feature amounts of each division region in each video of the video content, that is, the feature amounts obtained from the division region, and a moving image blur video is detected in the division region on the basis of the feature amounts. Note that FIG. 8 illustrates a configuration provided with one moving image blur video detecting section 201 but that a plurality of moving image blur video detecting sections 201 may be provided for the respective division regions.

The on period calculating section 102, the current value calculating section 103, and the driving control section 104 generate a driving control signal (BL driving control signal) for turning on (the LEDs in) the backlight 15, on the basis of the detection result for a moving image blur video from the moving image blur video detecting section 101 as described for the configuration in FIG. 4.

Note that the configuration of the signal processing section 11 (FIG. 1) of the liquid crystal display apparatus 10 has been described, with reference to FIG. 8, as a representative but that the signal processing section 21 (FIG. 2) of the self-luminous display apparatus 20 can be similarly configured. However, in that case, a driving control signal (OLED driving control signal) for turning on the self-luminous elements (for example, the OLEDs) in the self-luminous display section 23 is generated.

Concept of Impulse Driving

Figure 9:
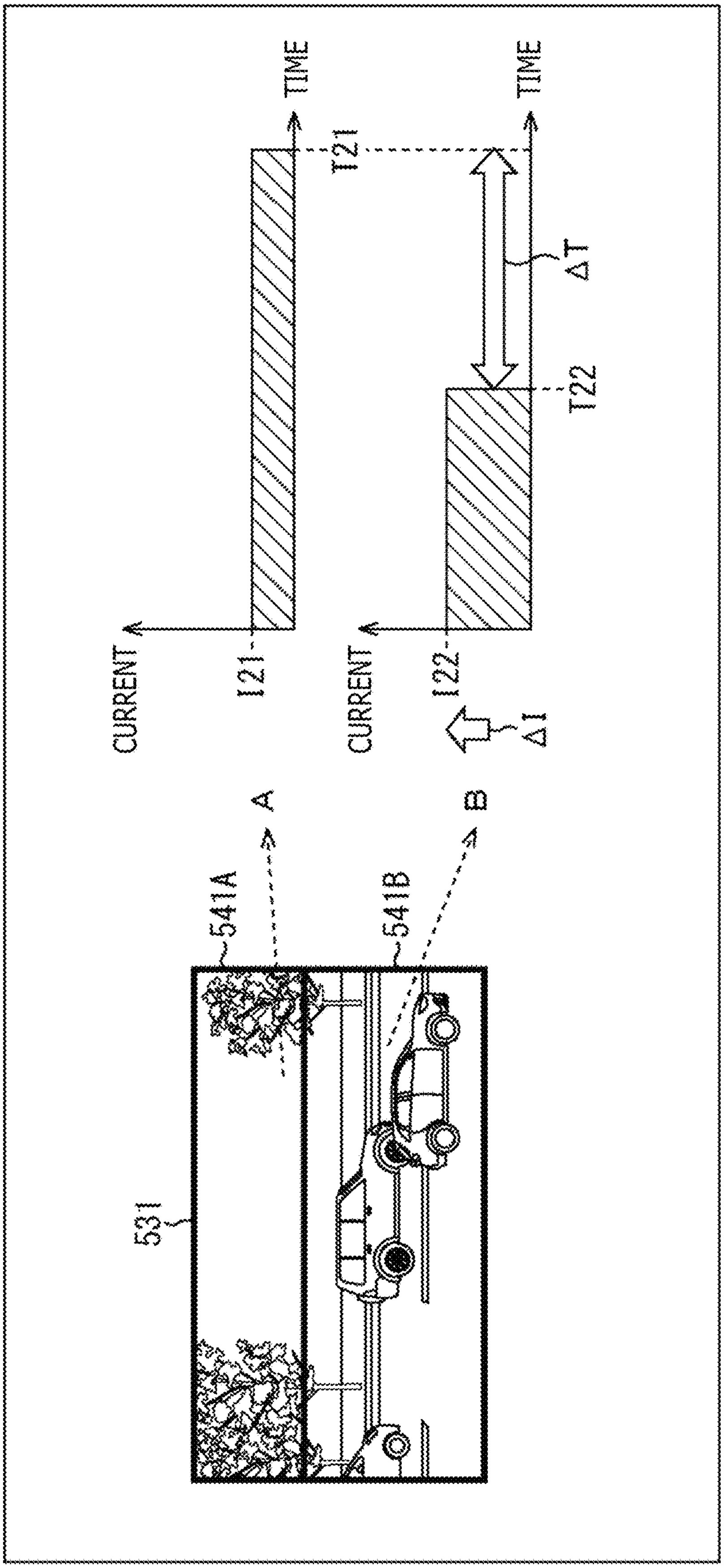
FIG. 9 is a diagram illustrating the concept of impulse driving according to the second embodiment.

FIG. 9 is a diagram illustrating the concept of impulse driving according to the second embodiment.

In FIG. 9, a video 531 is a video displayed on the liquid crystal display section 13 of the liquid crystal display apparatus 10 or the self-luminous display section 23 of the self-luminous display apparatus 20. Like the video 501 in FIG. 3, the video 531 illustrates that cars are traveling from the left side toward the right side in the figure.

Here, it is assumed that the entirety of the video 531 illustrated in FIG. 9 is divided into a first region 541A including a region corresponding to an upper video and a second region 541B including a region corresponding to a lower video. In this case, no moving object is present in the video in the first region 541A, whereas the cars are present in the video in the second region 541B as moving objects.

As described above, moving image blur may occur while objects in the video are moving, and thus, in this case, the impulse driving is performed on the video in the second region 541B including the moving objects (cars). On the other hand, the normal driving is performed on the video in the first region 541A including no moving object.

Specifically, in the entirety of the video 531 illustrated in FIG. 9, the normal driving is performed on the video in the first region 541A using the driving method in A of FIG. 9, whereas the impulse driving is performed on the video in the second region 541B using the driving method in B of FIG. 9.

That is, in the driving method in B of FIG. 9, the impulse driving for turning on the light emitting elements (LEDs) in the backlight 15 is performed at a constant current I22 (I22>I21) and during an on period T22 (T22<T21), extending the off period by a time corresponding to a decrease in on period from T21 to T22 (the off period is extended by ΔT (T21−T22)).

Additionally, in the driving method in B of FIG. 9, the current is increased from current I21 to current I22 (current is increased by ΔI (I22−I21) to allow the luminance to be maintained in spite of a decrease in on period.

Accordingly, the simultaneous occurrence of moving image blur over the entire region in the video 531 is rare, and by performing the impulse driving only on the video in the second region 541B including traveling cars, power consumption and shortening of the device life can be reduced.

Note that FIG. 9 illustrates that the entire region of the video 531 is divided into the upper first region 541A and the lower second region 541B. However, the division is not limited to halving of the entire region into the upper and lower regions, and the unit of the division can be optionally set, and for example, the following are possible: halving the entire region into a left region and a right region, quartering the entire region into an upper region, a lower region, a left region, and a right region, or division in more smaller units.

Additionally, in regard to the size of each division region, in FIG. 9, the lower second region 541B is larger in size than the upper first region 541A, and the division regions have different sizes. However, no such limitation is intended, and the division regions may have substantially the same size. Additionally, the shape of each division region is not limited to a rectangle and can be optionally determined.

Furthermore, in the above description, the impulse driving determination is performed using only the information obtained from the division regions of the video 531 (first region 541A and second region 541B). However, the current value and on period for each division region may be determined by, for example, adding the information obtained from the division regions (in other words, local information) to the information obtained from the entire region of the video 531.

For example, in a case where, in the impulse driving determination, objects in one division region are determined not to be moving, whereas objects in the other division region are determined to be moving, when the objects in the entire region are determined to be moving, the objects in the video can be determined to be moving, comprehensively on the basis of the determination results, allowing the impulse driving to be performed.

As described above, when the feature amounts such as the video information, the luminance information, and the resolution information are detected as the feature amounts of the video content and on the basis of the detection results for the feature amounts, control is performed on the driving of the light emitting section such as the backlight 15 (for example, the LEDs) of the liquid crystal display section 13 or the self-luminous elements (for example, the OLEDs) in the self-luminous display section 23, the entire region of the video is divided into several regions, and the driving of the light emitting section is controlled for each division region.

Thus, according to the degree at which moving image blur is easily visible, control can be performed on the on period and current value for the backlight 15 of the liquid crystal display section 13 and the pixel on period (on period for the self-luminous elements) and current value for the self-luminous display section 23, allowing moving image blur to be more appropriately removed (hold blur) and enabling further optimization of the image quality, minimization of the power consumption, and extension of the device life.

3. Third Embodiment

In recent years, for the backlight 15 in the liquid crystal display apparatus 10, attention has been paid to an LED backlight for which a KSF fluorescent substance ($K_2SiF_6$:$Mn^{4+}$) is adopted. The use of the KSF fluorescent substance is expected to improve the color reproduction range and chroma of the liquid crystal display apparatus 10.

In the third embodiment, a function improving method will be described that is intended for the liquid crystal display apparatus 10 using the LED backlight 15 for which the KSF fluorescent substance is adopted. Note that, in the description below, the LED backlight for which the KSF fluorescent substance is adopted and which is included in the backlight 15 in FIG. 1 is described as a LED backlight 15A for distinction from the other backlights.

Mechanism for Occurrence of Afterimage

Figure 10:
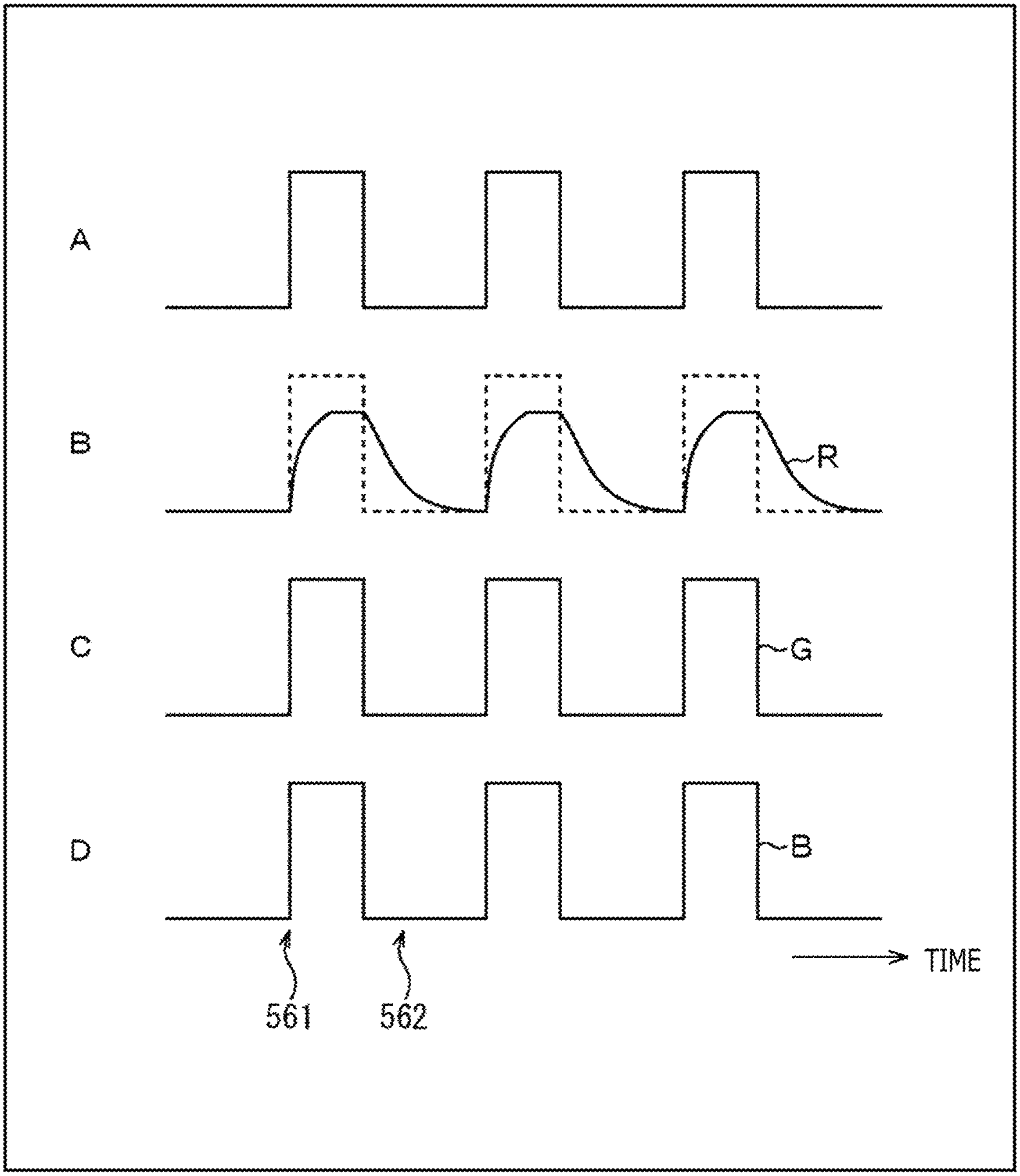
FIG. 10 is a timing chart illustrating a relationship between light emission timings for LEDs when a LED backlight is used for which a KSF fluorescent substance is adopted and corresponding RGB response properties.
Figure 11:
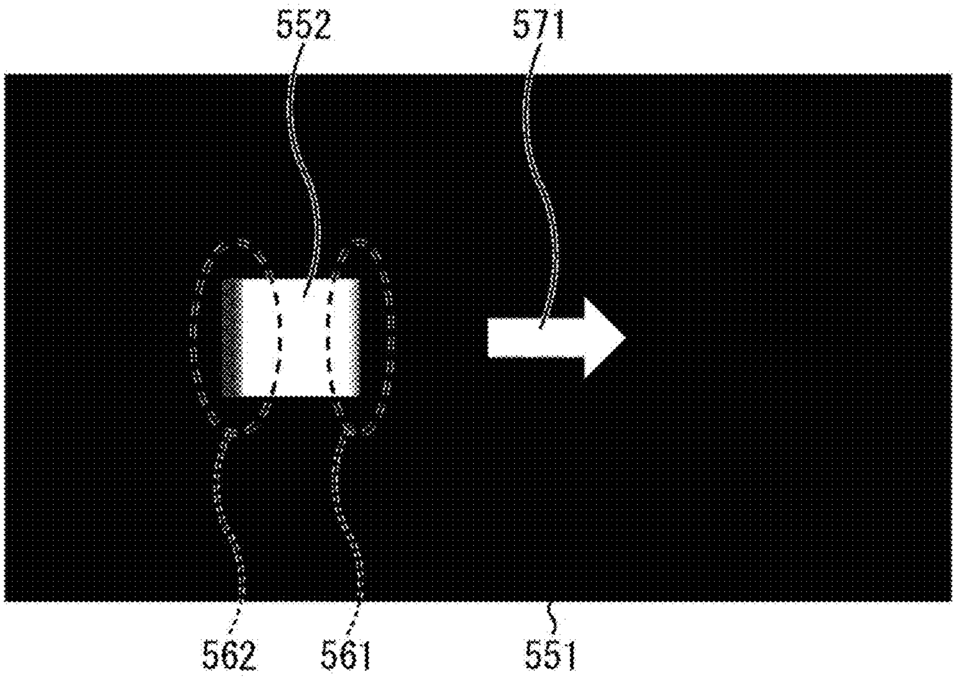
FIG. 11 is a diagram schematically representing occurrence of an afterimage when the LED backlight is used for which the KSF fluorescent substance is adopted.

With reference to FIG. 10 and FIG. 11, a mechanism for occurrence of an afterimage under the effect of a delayed response for red will be described; the afterimage occurs during the impulse driving when the LED backlight 15A is used for which the KSF fluorescent substance is adopted.

FIG. 10 illustrates the relationship between LED light emission timings of the LED backlight 15 and corresponding RGB response properties. However, A of FIG. 10 illustrates on/off timings for the LEDs in the LED backlight 15. Additionally, B, C, and D of FIG. 10 illustrate response properties for red (R), green (G), and blue (B) for each pixel (subpixel).

Here, timing charts in A, C, and D of FIG. 10 are focused on, it is found that the response properties for green (G) and blue (B) correspond to a rectangular wave corresponding to LED on/off periods for the LED backlight 15A. On the other hand, with timing charts in A and B of FIG. 10 focused on, and the timing charts indicate that the red (R) response properties do not correspond to a rectangular wave corresponding to the LED on/off periods for the LED backlight 15A and that the responses are delayed. In other words, the red (R) has a less sharp rising edge when the LEDs are turned on, and light remains when the LEDs are turned off.

Here, for example, as illustrated in FIG. 11, a scene is assumed in which a window 552 included in a video 551 moves in a direction indicated by an arrow 571 in the figure, that is, from the left side to the right side in the figure. However, in FIG. 11, the video 551 is an entirely black video, and the window 552 includes an entirely white region. In other words, here, a video is assumed in which a white rectangular object moves on an entirely black screen.

In this case, with the white window 552 in the video 551 focused on, an afterimage is seen that is caused by a delayed response for red (R) between the region of the white portion and the region of the black portion.

Specifically, in a dotted line 561 in FIG. 11, a partial region (the region corresponding to a timing in the timing chart in FIG. 10 pointed to by an arrow 561), which is otherwise in white, is in cyan due to the delayed response for read (R).

Additionally, in a dotted line 562 in FIG. 11, a partial region (the region corresponding to a timing in the timing chart in FIG. 10 pointed to by an arrow 562), which is otherwise in black, is in red due to the delayed response for read (R).

As described above, in a region of the video 551 that is otherwise displayed in black, white, and black, particularly at the boundary between the black and the white, the white is displayed in cyan or the black is displayed in red, due to the delayed response for read (R). In this case, the region where an afterimage is likely to occur corresponds to, for example, a portion (region) having a long LED off period and a high video contrast. The portion (region) is characterized by the easiness with which the afterimage is visible in the region.

Thus, in the third embodiment, in consideration of RGB response properties exhibited when the LED backlight 15A is used for which the KSF fluorescent substance is adopted, a driving frequency of the impulse driving is changed on the basis of a detection result for afterimage visibility. Thus, control is performed in which the effect of a delayed response for red (R) is mitigated.

First Example of Configuration of Signal Processing Section

Figure 12:
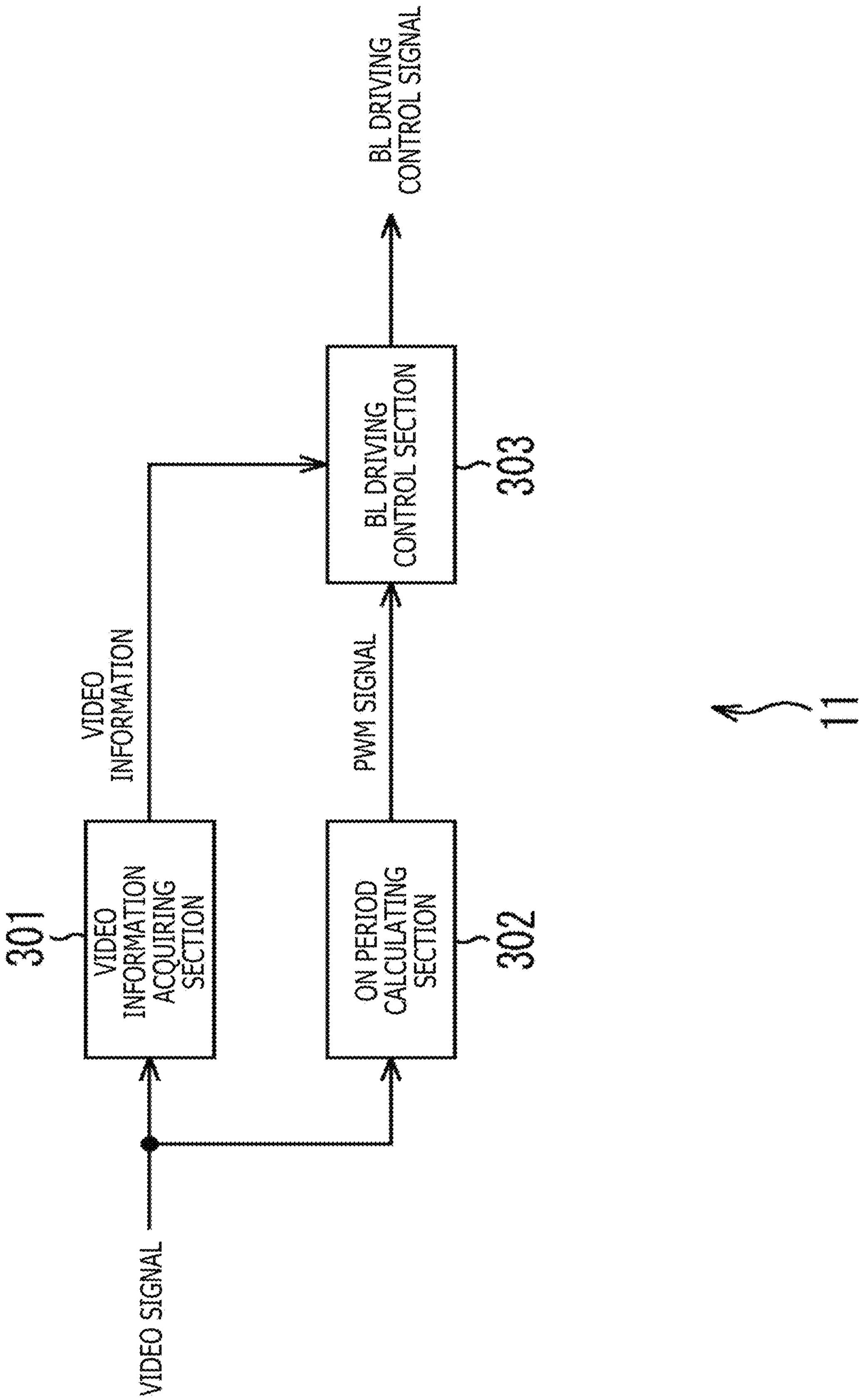
FIG. 12 is a block diagram illustrating a first example of a configuration of a signal processing section according to a third embodiment.

FIG. 12 is a block diagram illustrating a first example of a configuration of a signal processing section according to a third embodiment.

In FIG. 12, a signal processing section 11 includes a video information acquiring section 301, an on period calculating section 302, and a BL driving control section 303.

The video information acquiring section 301 executes video information acquisition processing on the video signal for the video content input to the video information acquiring section 301, and feeds a corresponding processing result to the BL driving control section 303 as video information. In the video information acquisition processing, for example, the visibility of the afterimage included in the video content is detected on the basis of the video signal, with a corresponding detection result output.

The on period calculating section 302 computes the on period for the LEDs in the LED backlight 15A on the basis of the video signal for the video content input to the on period calculating section 302, and feeds the BL driving control section 303 with a PWM signal corresponding to a computation result.

The BL driving control section 303 is fed with the video information from the video information acquiring section 301 and the PWM signal from the on period calculating section 302.

The BL driving control section 303 changes the driving frequency of the PWM signal on the basis of a detection amount for the visibility of an afterimage included in the video information. Additionally, the BL driving control section 303 generates a BL driving control signal corresponding to the result of change of the driving frequency, and feeds the BL driving control signal to the backlight driving section 14 (FIG. 1). Note that the details of the change of the driving frequency by the BL driving control section 303 will be described below with reference to FIG. 14.

Second Example of Signal Processing Section

Figure 13:
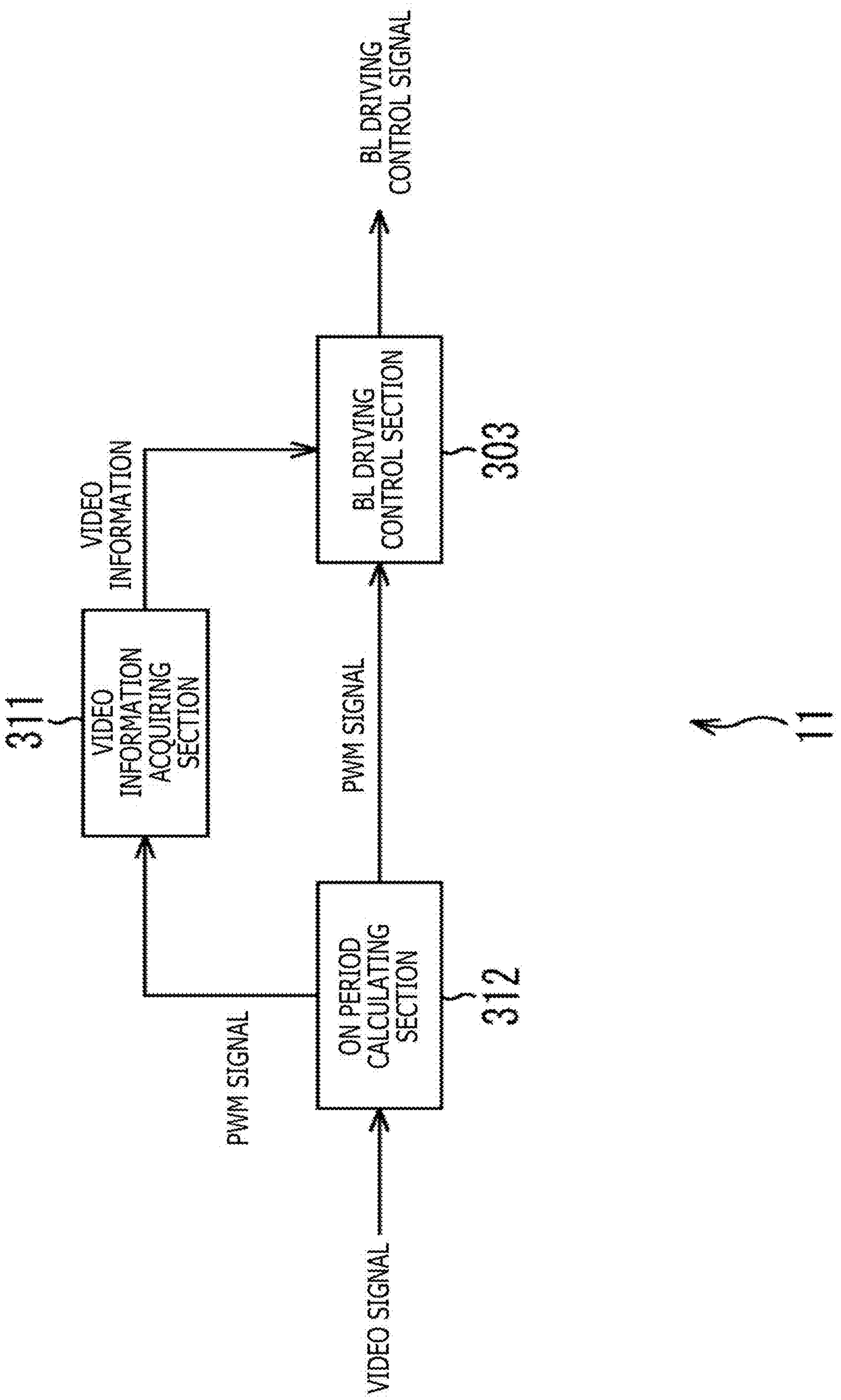
FIG. 13 is a block diagram illustrating a second example of a configuration of a signal processing section according to a third embodiment.

FIG. 13 is a block diagram of a second example of a configuration of a signal processing section according to the third embodiment.

In FIG. 13, the signal processing section 11 includes a video information acquiring section 311, a on period calculating section 312, and the BL driving control section 303. In other words, compared to the configuration illustrated in FIG. 12, the configuration in FIG. 13 includes the video information acquiring section 311 and the on period calculating section 312 instead of the video information acquiring section 301 and the on period calculating section 302.

The on period calculating section 312 computes the on period for the LEDs in the LED backlight 15A on the basis of the video signal for the video content input to the on period calculating section 312, and feeds the video information acquiring section 311 and the BL driving control section 303 with a PWM signal corresponding to a computation result.

The video information acquiring section 311 executes video information acquisition processing on the PWM signal fed from the on period calculating section 312, and feeds a corresponding processing result to the BL driving control section 303 as video information. In the video information acquisition processing, the visibility of an afterimage included in the video content is detected on the basis of the PWM signal, with a corresponding detection result output.

The BL driving control section 303 changes the driving frequency for the PWM signal from the on period calculating section 312 on the basis of the detection amount for the visibility of the afterimage included in the video information from the video information acquiring section 311, and generates a BL driving control signal corresponding to the result of the change of the driving frequency. Note that the details of the change of the driving frequency by the BL driving control section 303 will be described below with reference to FIG. 14.

Note that, for convenience of description, FIG. 12 and FIG. 13 illustrate, as the configuration of the signal processing section 11, the first example including the video information acquiring section 301, the on period calculating section 302, and the BL driving control section 303 and the second example including the video information acquiring section 311, the on period calculating section 312, and the BL driving control section 303 but that, in actuality, the signal processing section 11 can be configured as follows.

That is, as illustrated in FIG. 4 or FIG. 8, the signal processing section 11 in FIG. 12 and FIG. 13 may include the moving image blur video detecting section 101 or the moving image blur video detecting section 201, the on period calculating section 102, the current value calculating section 103, and the driving control section 104.

Specifically, the video information acquiring section 301 in FIG. 12 and the video information acquiring section 311 in FIG. 13 may include the function of the video information acquiring section 111 in FIG. 4 or FIG. 8. The on period calculating section 302 in FIG. 12 and the on period calculating section 312 in FIG. 13 may include the function of the on period calculating section 102 in FIG. 4 or FIG. 8. The BL driving control section 303 in FIG. 12 or FIG. 13 may include the function of the driving control section 104 in FIG. 4 or FIG. 8. Thus, the signal processing section 11 according to the third embodiment (FIG. 12 and FIG. 13) can perform the driving control illustrated in the third embodiment in addition to the driving control illustrated in the first embodiment or second embodiment described above.

Example of Change of Driving Frequency

Figure 14:
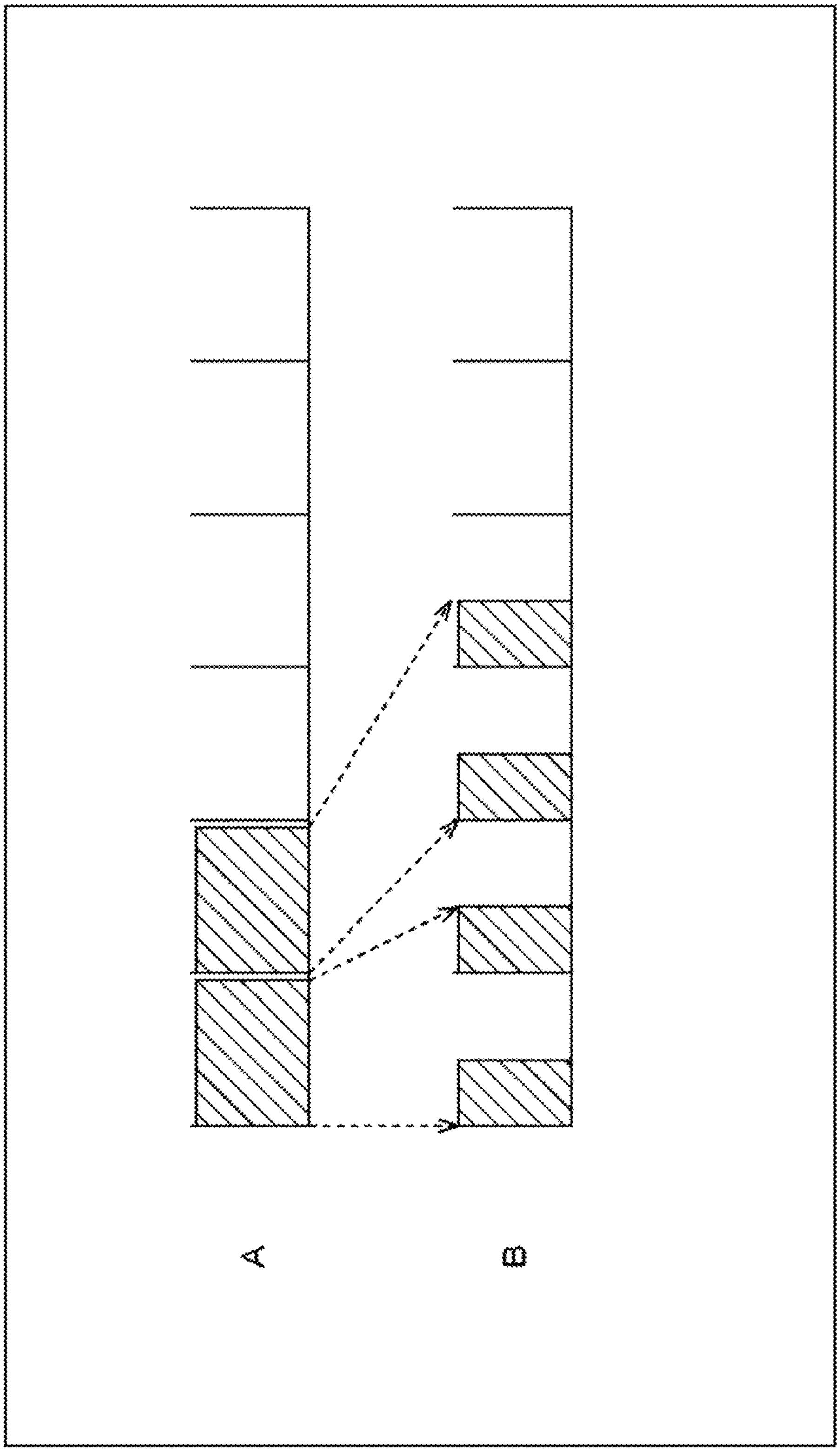
FIG. 14 is a diagram illustrating an example of changes in driving frequency made by a BL driving control section according to a third embodiment.

FIG. 14 is a diagram illustrating an example of the change of the driving frequency performed by the BL driving control section 303 in FIG. 12 or FIG. 13.

A of FIG. 14 illustrates a driving method executed in a case where the effect of a delayed response for red (R) is not taken into account. On the other hand, B of FIG. 14 illustrates a driving method executed in a case where the effect of the delayed response for red (R) is taken into account.

Here, compared to the driving method in A of FIG. 14, the driving method in B of FIG. 14 involves an increased driving frequency and a reduced on/off pulse width due to the division of the rectangular wave of the PWM signal. Note that, in this case, for example, each of two blocks illustrated in A of FIG. 14 is halved into four blocks as illustrated in B of FIG. 14.

The driving frequency is increased on the basis of the detection result for the visibility of an afterimage as described above. Then, when an afterimage is caused by a delayed response for red (R), the time (period of time) for which the afterimage is visible can be reduced. Specifically, for example, compared to execution of the driving method in A of FIG. 14, execution of driving using the driving method in B of FIG. 14 can substantially halve the time for which the afterimage is visible, due to the halved rectangular wave of the PWM signal (due to a changed duty ratio).

For example, in particular, regions where an afterimage is likely to occur correspond to portions (regions) with a high video contrast, and in such a region, the afterimage caused by the delayed response for red (R) can be reduced by performing the driving based on the driving method in B of FIG. 14.

Specifically, for example, a case is assumed that, in the driving method in A of FIG. 3 described above, the frame rate is 120 Hz and the on period T1 is 8 ms. Then, in the driving method in B of FIG. 3, driving can be performed in which an on period T2 of 4 ms is quartered and in which an on period of 1 ms is repeated four times. Even in a case where the on period is thus divided, the brightness itself of lighting of the LEDs is not changed (a value resulting from integration remains the same before and after the division).

Note that, when the driving frequency (lighting frequency) illustrated in FIG. 14 is changed, a rapid change in driving frequency leads to luminance flicker, which may degrade quality of video display. Thus, the BL driving control section 303 suitably gradually changes the driving frequency.

Additionally, to prevent a change in luminance of the video, the BL driving control section 303 makes the sum of on periods after a change in driving frequency (the on periods during one frame) substantially the same as on periods before the change in driving frequency (the on periods during one frame). In other words, the BL driving control section 303 makes the on periods before the change in driving frequency equal to the on periods after the change in driving frequency.

As described above, in the third embodiment, when the feature amounts such as the video information, the luminance information, and the resolution information are detected as the feature amounts of the video content, and the on period and current value for (the LEDs in) the LED backlight 15A of the liquid crystal display section 13 are controlled on the basis of the detection results, control is performed in which the effect of the delayed response for red (R) is reduced by changing the driving frequency for the impulse driving on the basis of the detection result for the visibility of the afterimage included in the video information.

Specifically, the liquid crystal display apparatus 10 can determine the degree of the afterimage on the basis of the detection result for the visibility of the afterimage and control the period of lighting of (the LEDs in) the LED backlight 15A to reduce the afterimage according to the determination result. Thus, the liquid crystal display apparatus 10 can change the processing depending on the properties of the LED backlight 15A for which the KSF fluorescent substance is adopted, enabling the adverse effect of the impulse driving to be suppressed.

4. Fourth Embodiment

Incidentally, in the liquid crystal display apparatus 10 (FIG. 1) and the self-luminous display apparatus 20 (FIG. 2), for example, as an OSD (On Screen Display), graphics such as a GUI (Graphical User Interface) such as a setting menu may be displayed on a display screen. In a case where a GUI of this type or the like is being displayed, a viewer/listener pays attention to the GUI on the display screen, leading to no need for removing moving image blur (hold blur), and thus the effect removing moving image blur is suppressed to inhibit an increase in power consumption and a reduction in device life.

Concept of Impulse Driving

Figure 15:
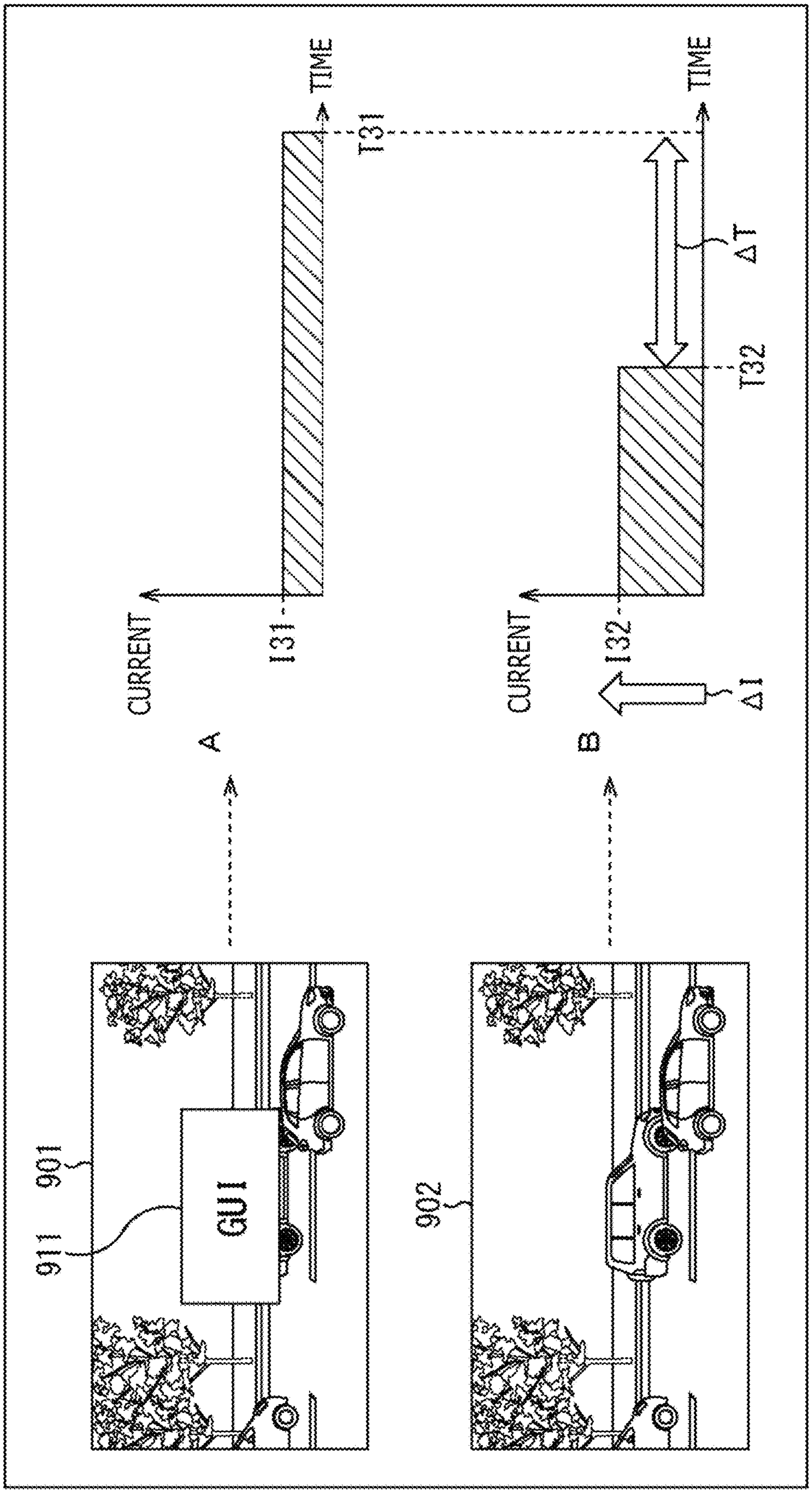
FIG. 15 is a diagram illustrating the concept of impulse driving according to a fourth embodiment.

FIG. 15 is a diagram illustrating the concept of impulse driving according to a fourth embodiment.

In FIG. 15, a video 901 and a video 902 are videos displayed on the liquid crystal display section 13 of the liquid crystal display apparatus 10 or the self-luminous display section 23 of the self-luminous display apparatus 20.

Here, a comparison between the video 901 and the video 902 indicates that both videos include traveling cars but that, in the video 901, a GUI 911 such as a setting menu corresponding to an operation of the viewer/listener is superimposed on the video with the traveling cars.

At this time, the video 901 is a video of a scene in which the cars are traveling, moving image blur may occur, and the viewer/listener pays attention to the GUI 911 on the display screen and is not particularly conscious of the video of the cars behind the GUI 911. Thus, removing moving image blur is unnecessary.

On the other hand, the GUI 911 is not superimposed on the video 902, and the viewer/listener looks at the video of the traveling cars. Thus, as described above, removing moving image blur is needed.

Specifically, in the video 901 on which the GUI 911 is superimposed, the normal driving is performed using the driving method in A of FIG. 15. In the video 902 on which the GUI 911 is not superimposed, the impulse driving is performed using the driving method in B of FIG. 15.

In other words, in the driving method in B of FIG. 15, the impulse driving is performed in which the light emitting elements (LEDs) in the backlight 15 are kept on at a constant current I32 (I32>I31) during an on period T32 (T32<T31). Compared to the driving method in A of FIG. 15 (normal driving), the driving method in B of FIG. 15 involves a shorter on period and a corresponding longer off period, allowing moving image blur to be removed.

In contrast, the driving method in A of FIG. 15 suppresses the effect removing moving image blur but involves a reduced magnitude of current compared to the driving method in B of FIG. 15 (impulse driving) (I31<I32), thus allowing an increase in power consumption to be minimized. As a result, a reduction in the lives of the devices such as the liquid crystal display section 13 (backlight 15) and the self-luminous display section 23 can be suppressed.

Accordingly, in the fourth embodiment, in a case where the GUI 911 is superimposed on the video 901, the viewer/listener pays attention to the GUI 911, leading to no need for removing moving image blur, and thus the effect removing moving image blur is suppressed. Thus, the liquid crystal display apparatus 10 or the self-luminous display apparatus 20 can suppress an increase in power consumption and a reduction in device life.

Note that GUIs displayed on the liquid crystal display section 13 or the self-luminous display section 23 include a GUI generated by external equipment (for example, a player for reproduction in an optical disc) and a GUI generated inside the liquid crystal display apparatus 10 or the self-luminous display apparatus 20. Thus, a configuration used in a case where the GUI is generated by external equipment is hereinafter illustrated in FIG. 16, and a configuration used in a case where the GUI is generated inside the display apparatus is illustrated in FIG. 17.

Configuration of Signal Processing Section

Figure 16:
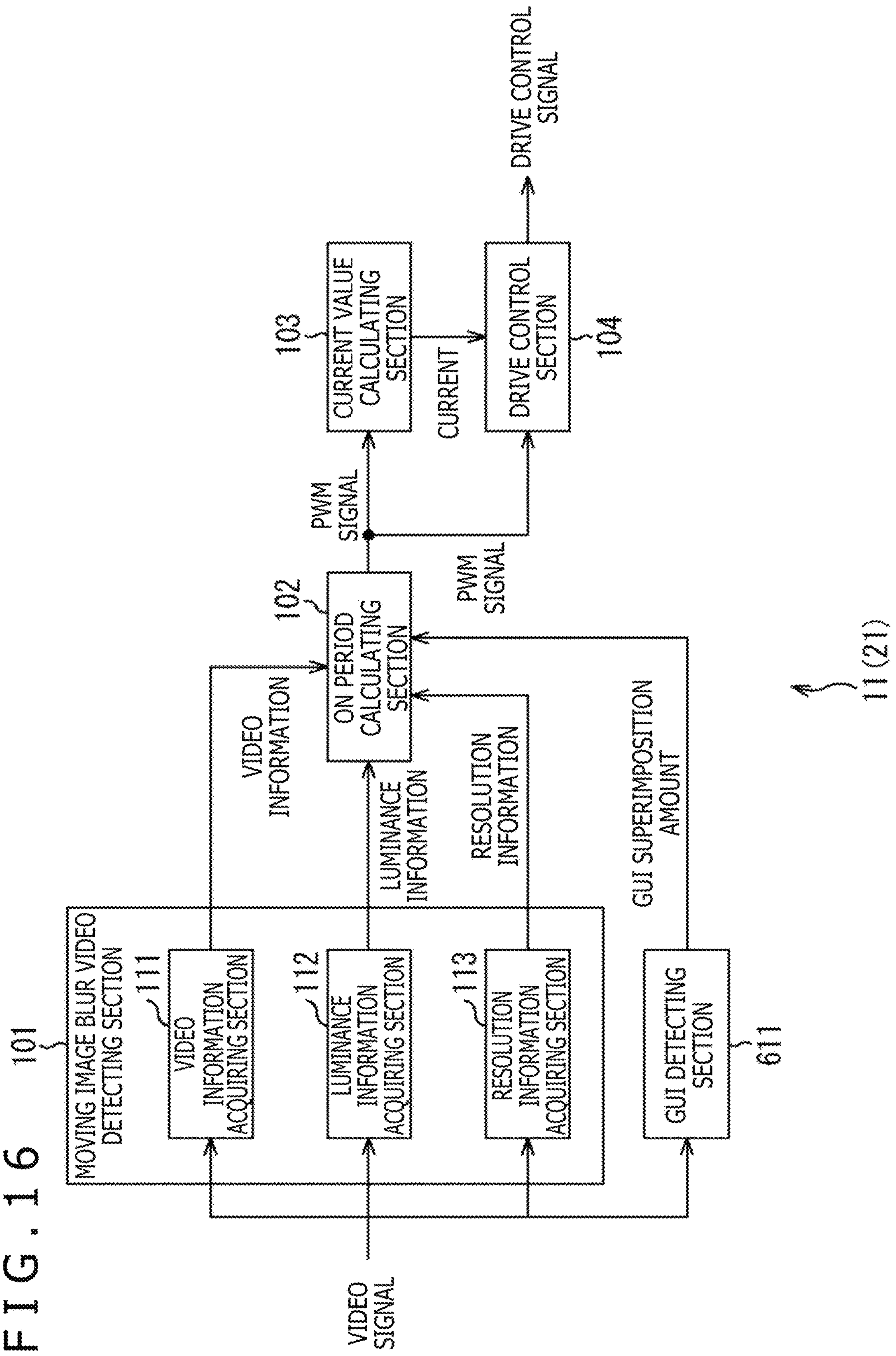
FIG. 16 is a block diagram illustrating a first example of a configuration of a signal processing section according to the fourth embodiment.
Figure 17:
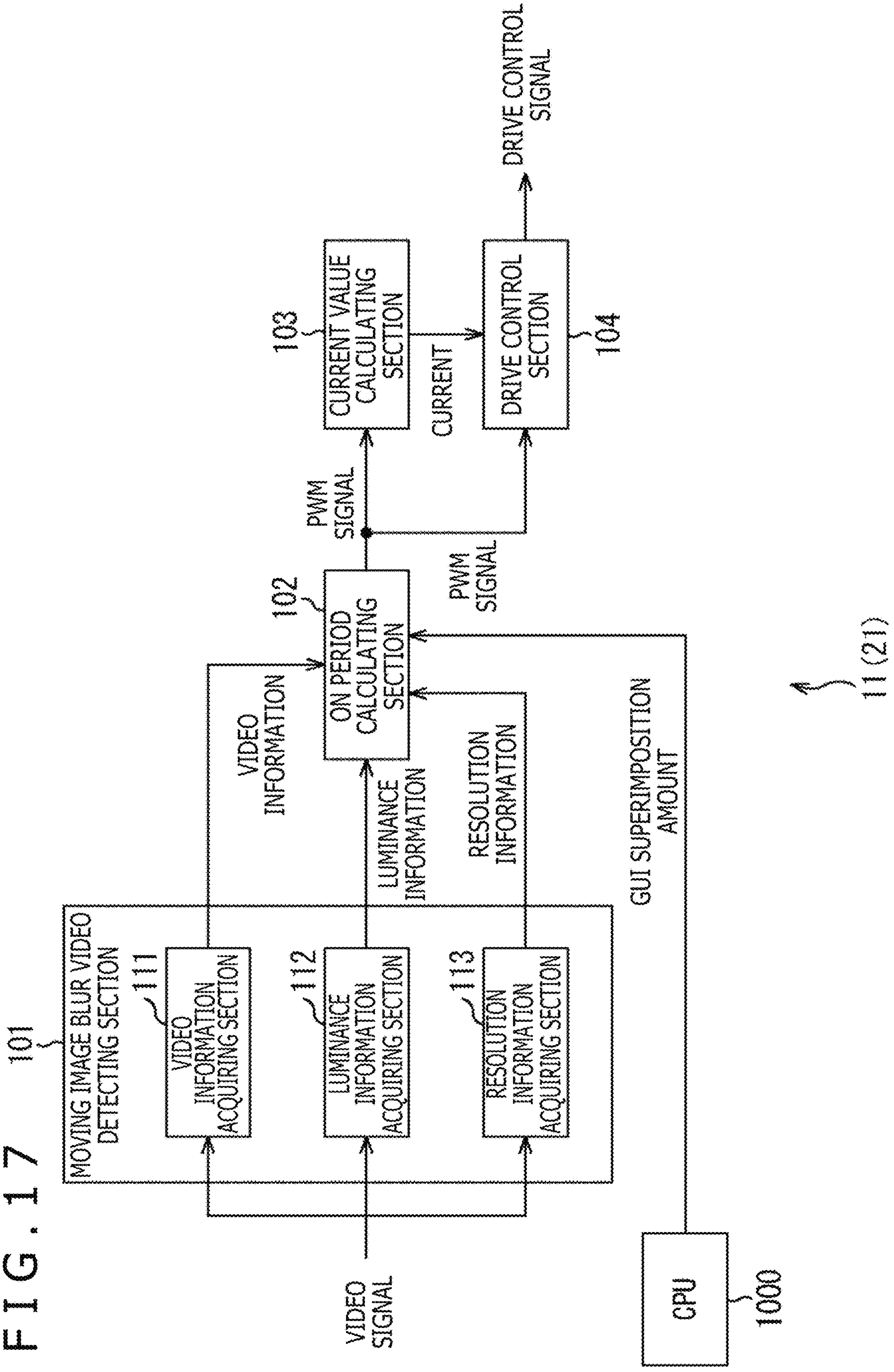
FIG. 17 is a block diagram illustrating a second example of the configuration of the signal processing section according to the fourth embodiment.

FIG. 16 is a block diagram illustrating a first example of a configuration of the signal processing section according to the fourth embodiment. In other words, FIG. 16 illustrates a configuration of the signal processing section 11 used in a case where the GUI is generated inside the display apparatus.

In FIG. 16, the signal processing section 11 includes the moving image blur video detecting section 101, the on period calculating section 102, the current value calculating section 103, the driving control section 104, and a GUI detecting section 611. In other words, compared to the configuration of the signal processing section 11 in FIG. 4, the signal processing section 11 in FIG. 16 includes the GUI detecting section 611 newly added.

In the moving image blur video detecting section 101, the video information acquiring section 111, the luminance information acquiring section 112, and the resolution information acquiring section 113 acquire the video information, the luminance information, and the resolution information as described for the configuration in FIG. 4. The video information, luminance information, and resolution information detected by the moving image blur video detecting section 101 are the feature amounts of the video content, which allow a moving image blur video to be detected.

The GUI detecting section 61 executes GUI detection processing on the video signal for the video content, and feeds a corresponding processing result to the on period calculating section 102 as the GUI superimposition amount.

The GUI detection processing allows the GUI displayed on the display screen to be detected using information, for example, a moving vector amount between video frames, contrast information, and frequency information. In this case, for example, the superimposition amount of the GUI superimposed on the video displayed on the display screen (for example, the ratio of the region of the GUI to the entire region of the display screen) is detected.

In other words, the GUI detection processing can also be said to include detecting the GUI superimposition amount of the GUI superimposed on the display screen as an example of the graphic amount of graphics. Note that the GUI detection processing may use the feature amount detected by the moving image blur video detecting section 101 (for example, the moving vector amount or the resolution information). Additionally, the details of the GUI detection processing will be described below with reference to FIG. 19 and FIG. 20.

As described above, the GUI superimposition amount detected by the GUI detecting section 611 is a feature amount of the video content. In this case, the effect removing moving image blur is suppressed depending on the GUI superimposition amount. Specifically, the liquid crystal display apparatus 10 suppresses, on the basis of the GUI superimposition amount, the effect removing moving image blur, even in a case where a moving image blur video is detected by the feature amount such as the video information.

The on period calculating section 102, the current value calculating section 103, and the driving control section 104 generate driving control signals (BL driving control signals) for turning on (the LEDs in) the backlight 15 on the basis of the detection result for a moving image blur video from the moving image blur video detecting section 101 and the detection result for the GUI from the GUI detecting section 611 as described for the configuration in FIG. 4.

Another Configuration of Signal Processing Section

FIG. 17 is a block diagram illustrating a second example of a configuration of the signal processing section according to the fourth embodiment. In other words, FIG. 17 illustrates a configuration of the signal processing section 11 used in a case where the GUI superimposed on the video is generated inside the liquid crystal display apparatus 10.

Figure 25:
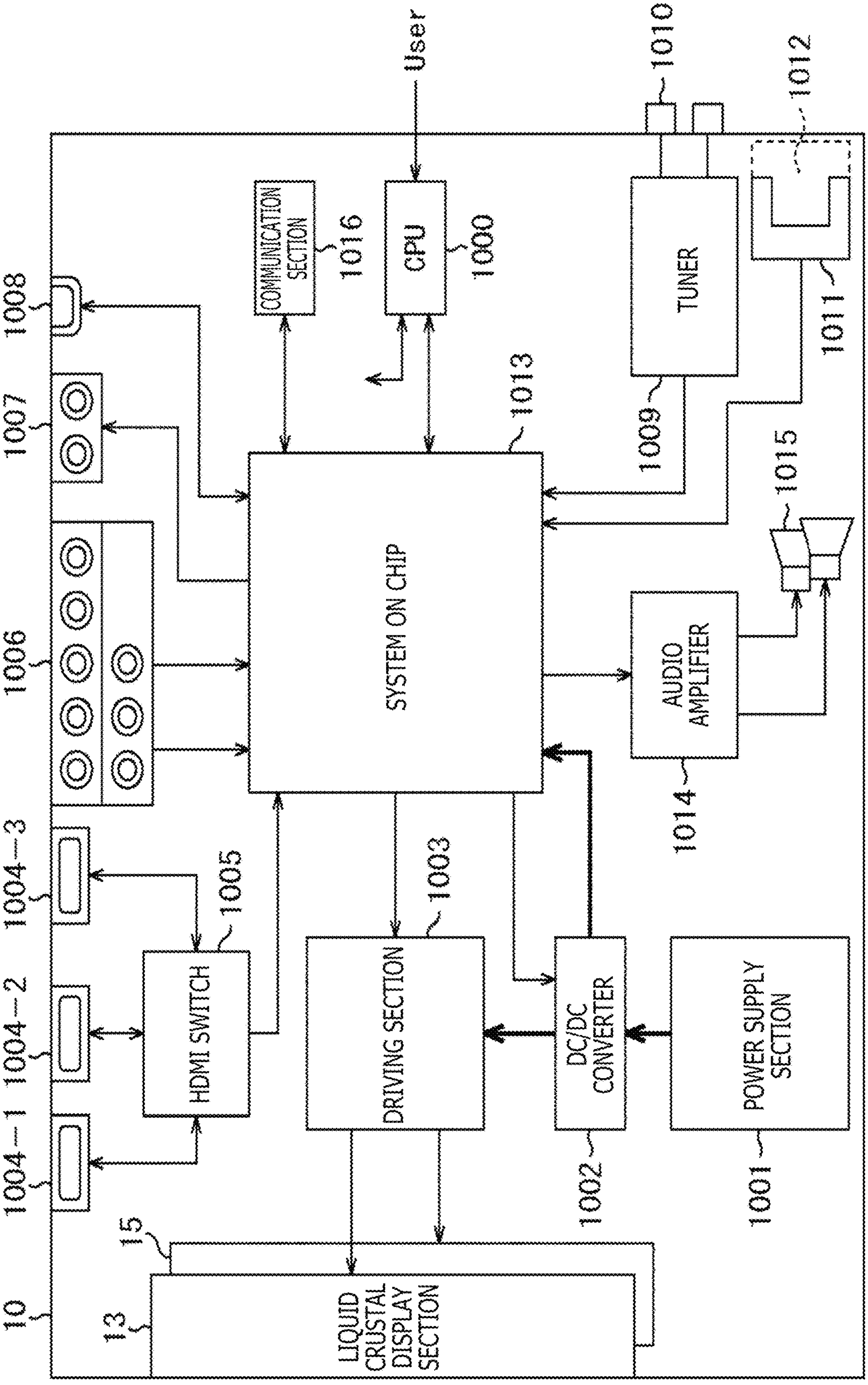
FIG. 25 is a diagram illustrating an example of a detailed configuration of a liquid crystal display apparatus to which the present technology is applied.

In FIG. 17, the signal processing section 11 includes, like the configuration of the signal processing section 11 in FIG. 4, the moving image blur video detecting section 101, the on period calculating section 102, the current value calculating section 103, and the driving control section 104, but differs from the configuration of the signal processing section 11 in FIG. 4 in that the on period calculating section 102 is fed with the GUI superimposition amount from a CPU 1000 (FIG. 25).

The CPU 1000 operates as a central processing apparatus in the liquid crystal display apparatus 10, for various types of calculation processing, various types of operation control, and the like. In a case where display of the GUI such as the setting menu is indicated, the CPU 1000 acquires, from a memory (not illustrated), the GUI superimposition amount (for example, the size) of the GUI superimposed on the liquid crystal display section 13, and feeds the GUI superimposition amount to the on period calculating section 102. In other words, the GUI superimposition amount (graphic amount) fed from the CPU 1000 is a feature amount of the video content.

The on period calculating section 102, the current value calculating section 103, and the driving control section 104 generate driving control signals (BL driving control signals) for turning on (the LEDs in) the backlight 15 on the basis of the detection result for a moving image blur video from the moving image blur video detecting section 101 and the GUI superimposition amount from the CPU 1000 as described for the configuration in FIG. 4, and the like.

Thus, in the liquid crystal display apparatus 10, even in a case where a moving image blur video is detected on the basis of the feature amount such as the video information, the effect removing moving image blur is suppressed on the basis of the GUI superimposition amount.

Note that the configuration of the signal processing section 11 of the liquid crystal display apparatus 10 (FIG. 1) has been described, with reference to FIG. 16 and FIG. 17, as a representative but that the signal processing section 21 of the self-luminous display apparatus 20 (FIG. 2) can be similarly configured. However, in that case, a driving control signal for turning on the self-luminous elements (for example, the OLEDs) in the self-luminous display section 23 is generated.

Flow of Impulse Driving Determination Processing

Now, with reference to a flowchart in FIG. 18, a flow of the impulse driving determination processing executed by the signal processing section according to the fourth embodiment will be described.

In steps S31 to S33, as is the case with steps S11 to S13 in FIG. 7, in a case where the moving image amount is determined to be small in the determination processing in step S31, in a case where the number of edge portions is determined to be small in the determination processing in step S32, or in a case where driving with brightness focused on is determined to be performed in the determination processing in step S33, then the processing is advanced to step S35 to perform the normal driving (S35).

Additionally, in a case where, after the moving image amount is determined to be large in the determination processing in step S31, the number of edge portions is determined to be large in the determination processing in step S32 and further driving with brightness not focused on is determined to be performed in the determination processing in step S33, then the processing is advanced to step S34.

In step S34, the signal processing section 11 determines whether or not the graphic amount such as the GUI superimposition amount of the GUI superimposed on the video is large. For example, in the determination processing in step S34, by comparing a preset threshold for graphic amount determination with the GUI superimposition amount detected by the GUI detecting section 611 (FIG. 16) or the GUI superimposition amount fed from the CPU 1000 (FIG. 17), whether or not the graphic amount in the target video is large (for example, whether or not the ratio of the region of the GUI to the entire region of the display screen is high) is determined.

In step S34, in a case where the graphic amount is larger than the threshold, that is, in a case where the graphic amount is determined to be large, the processing is advanced to step S35. In step S35, the signal processing section 11 causes the backlight 15 to be driven on the basis of the normal driving. A case where the normal driving is performed is assumed to be, for example, a case where the GUI is displayed on the full screen.

Additionally, in step S34, in a case where the graphic amount is smaller than a threshold, that is, in a case where the graphic amount is determined to be small, the processing is advanced to step S36. In step S36, the signal processing section 11 causes the backlight 15 to be driven on the basis of the impulse driving. A case where the impulse driving is performed is assumed to be, for example, a case where the region of the GUI with respect to the entire region of the display screen is small.

The flow of the impulse driving determination processing has been described above. Note that the order of the steps of determination processing (S31, S32, S33, and S34) in the impulse driving determination processing in FIG. 18 is optional, and not all of the steps of determination processing need to be executed. Additionally, an appropriate value can be set for the threshold for determination according to various conditions.

Figure 18:
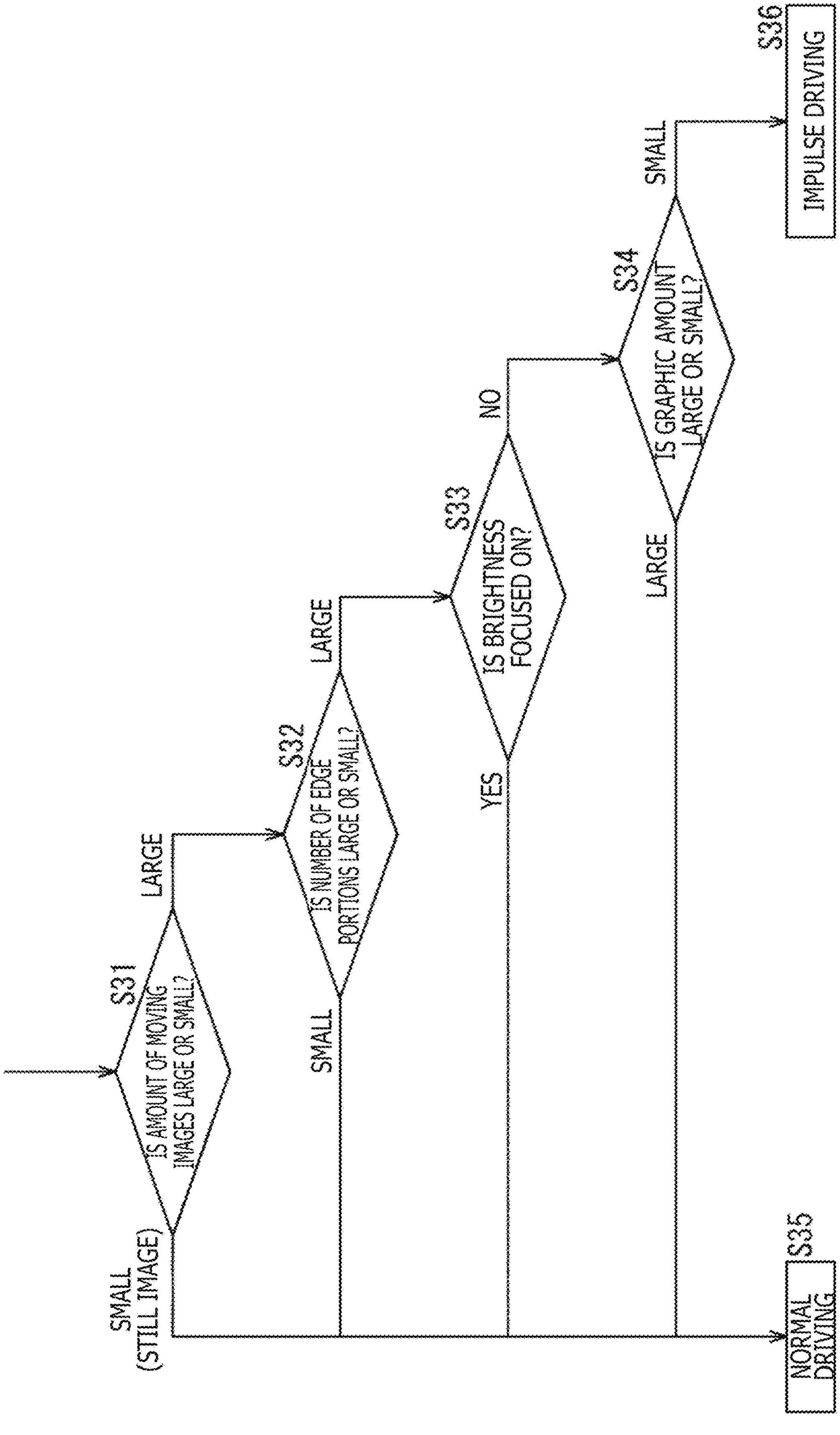
FIG. 18 is a flowchart illustrating impulse driving determination processing according to the fourth embodiment.

Note that the impulse driving determination processing has been described, with reference to FIG. 18, as being executed by the signal processing section 11 (FIG. 1) but may be executed by the signal processing section 21 of the self-luminous display apparatus 20 (FIG. 2). However, in a case where the signal processing section 21 executes the impulse driving determination processing, the target for driving control is (self-luminous elements such as the OLEDs in) the self-luminous display section 23.

Example of GUI Detecting Method

Now, with reference to FIG. 19 and FIG. 20, an example of the GUI detection processing executed by the GUI detecting section 611 in FIG. 16 will be described.

The GUI superimposed on the video is characterized by being displayed in a specific region of the display screen and having a high contrast and clear text contours such that the viewer/listener can easily view the GUI. Now, a method will be described in which, in light of the above-described characteristics, the display screen is divided into a plurality of screen blocks and in which, on the basis of the moving vector amount (movement amount), contrast information, and frequency information obtained from each of the screen blocks, whether or not the GUI is present in the screen block is determined.

Figure 19:
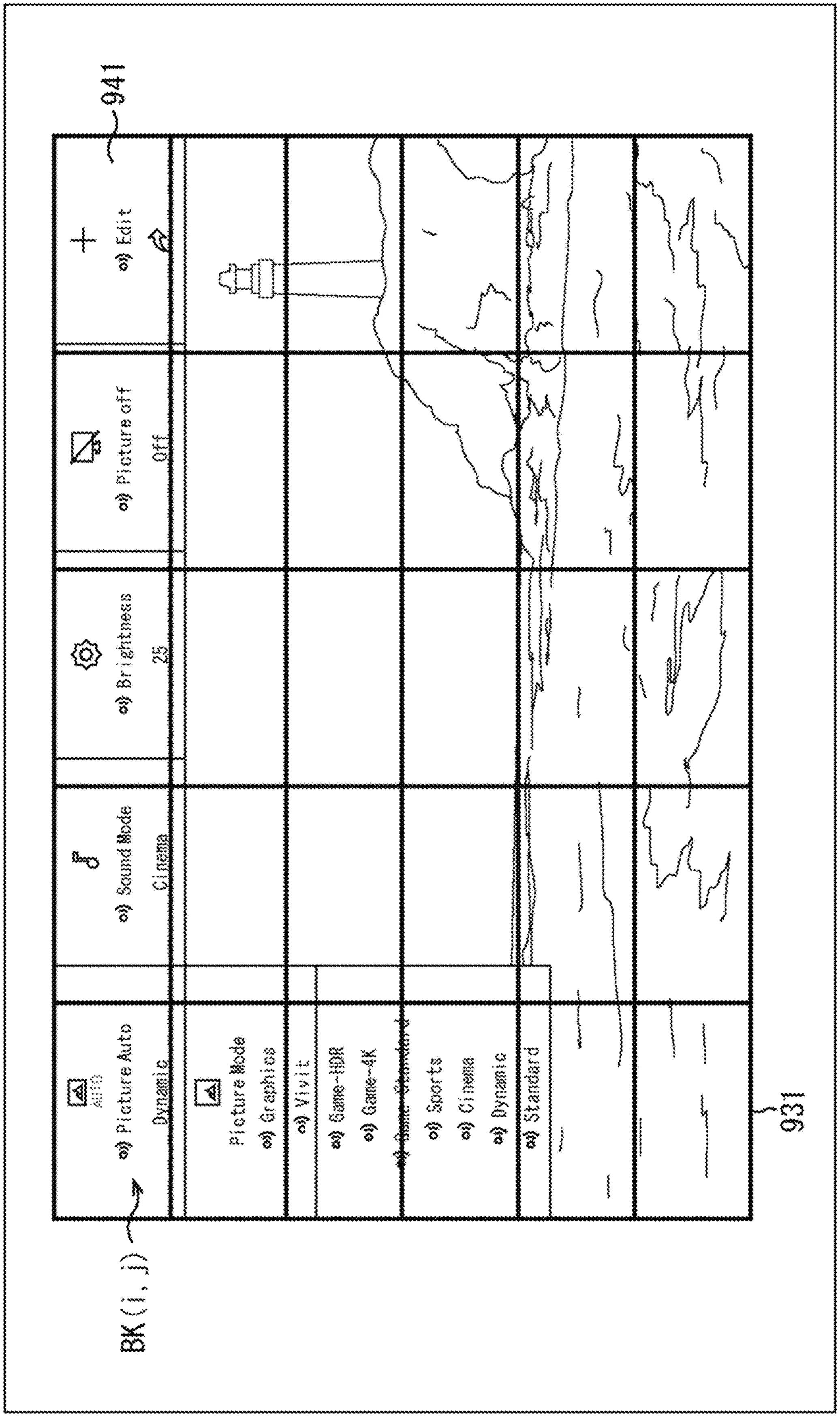
FIG. 19 is a diagram illustrating an example of determination for GUIs in respective screen blocks.

FIG. 19 is a diagram illustrating an example of determination for the GUI in each screen block.

In FIG. 19, a GUI 941 used as a setting menu corresponding to an operation of the viewer/listener is superimposed on a video 931 displayed on the display screen in an inverse L shape. In this case, it is assumed that the display screen is divided into six pieces in the horizontal direction and five pieces in the vertical direction as illustrated by vertical and horizontal thick lines on the display screen. Here, an i-th row and a j-th column in each screen block BK on the display screen is represented as a screen block BK (i, j).

Here, screen blocks BK (1, 1) to BK (1, 5) in the first row correspond to regions on which a GUI 941 is superimposed. Furthermore, a screen block BK (2, 1) in the second row, a screen block BK (3, 1) in the third row, and a screen block BK (4, 1) in the fourth row correspond to regions on which the GUI 941 is superimposed.

Additionally, for screen blocks BK (2, 2) to BK (2, 5) in the second row, a screen block BK (3, 2) in the third row, a screen block BK (4, 2) in the fourth row, and screen blocks BK (5, 1) and BK (5, 2) in the fifth row, the GUI 941 is superimposed on a part of the region of each screen block BK. Note that the screen blocks BK other than the screen blocks BK listed here correspond to regions on which the GUI 941 is not superimposed.

As described above, screen blocks BK on which the GUI 941 is superimposed are mixed with screen blocks BK on which the GUI 941 is not superimposed. In this case, whether or not the GUI 941 is present in each screen block BK is determined on the basis of the movement amount, contrast information, and frequency information obtained for each screen block BK.

Figure 20:
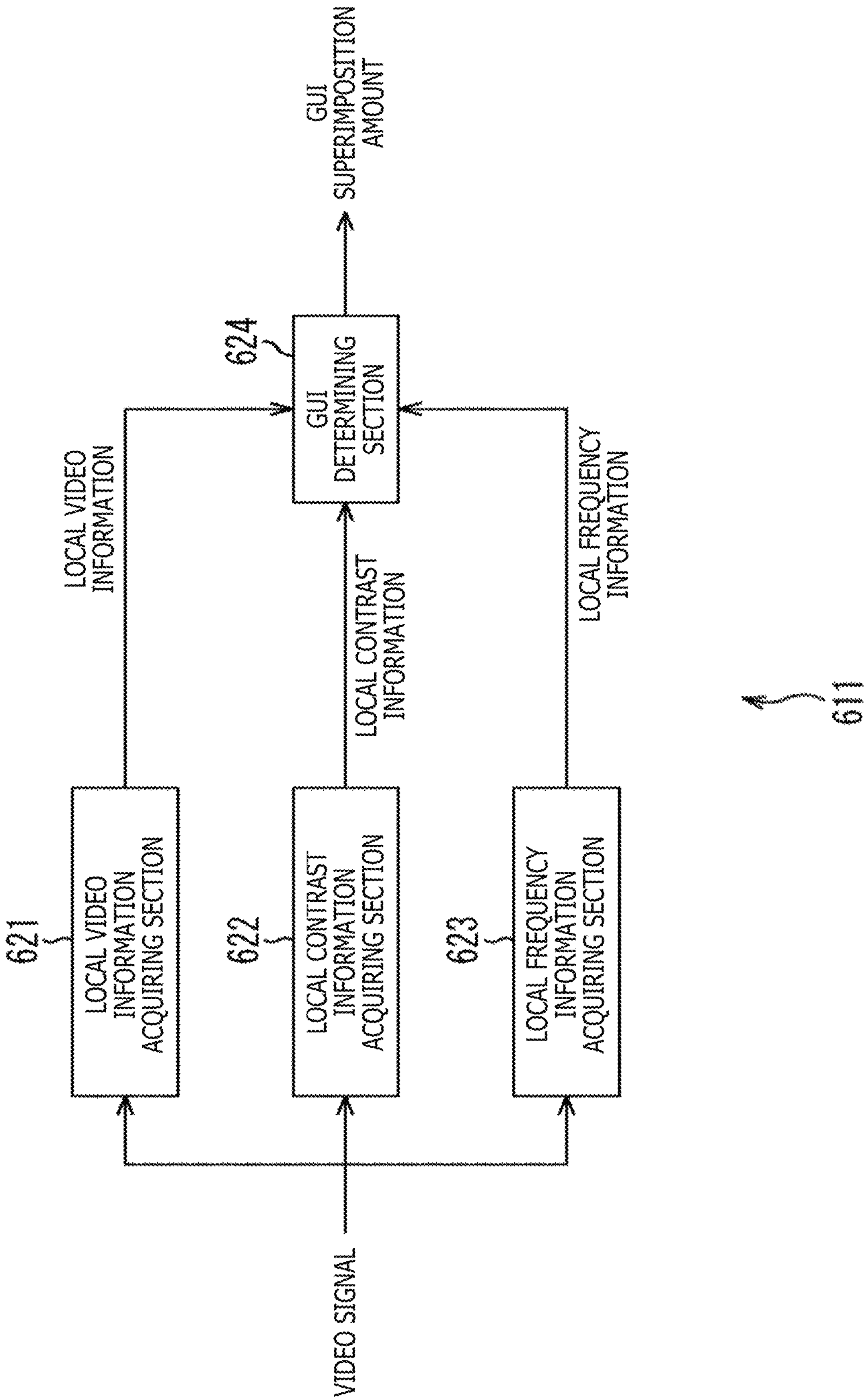
FIG. 20 is a block diagram illustrating an example of a detailed configuration of a GUI detecting section.

FIG. 20 is a block diagram illustrating an example of a detailed configuration of the GUI detecting section 611 in FIG. 16.

In FIG. 20, the GUI detecting section 611 includes a local video information acquiring section 621, a local contrast information acquiring section 622, local frequency information acquiring section 623, and a GUI determining section 624.

The local video information acquiring section 621 executes local video information acquisition processing on the video signal for the video content, and feeds a corresponding processing result to the GUI determining section 624 as local video information.

In the local video information acquisition processing, the local video information is obtained by, for example, detecting, for each screen block, the moving image amount as an indicator representing the movement of an object in the video using the moving vector amount and the like.

The local contrast information acquiring section 622 executes local contrast information acquisition processing on the video signal for the video content, and feeds a corresponding processing result to the GUI determining section 624 as local contrast information.

In the local contrast information acquisition processing includes, for example, for each screen block, comparing a reference region and a comparative region included in the video in each screen block to determine a difference between the darkest portion and the brightest portion, thus obtaining local contrast information.

The local frequency information acquiring section 623 executes local frequency information acquisition processing on the video signal for the video content, and feeds a corresponding processing result to the GUI determining section 624 as local frequency information.

The local frequency information acquisition processing includes, for example, for each screen block, converting the video in each screen block into a spatial frequency band and applying a predetermined filter (for example, a wide band pass filter or the like) to the spatial frequency band, thus obtaining local frequency information.

The GUI determining section 624 is fed with local video information from the local video information acquiring section 621, local contrast information from the local contrast information acquiring section 622, and local frequency information from the local frequency information acquiring section 623.

The GUI determining section 624 determines, for each screen block, whether or not the GUI is superimposed on the screen block on the basis of the local video information, the local contrast information, and the local frequency information. The GUI determining section 624 feeds the on period calculating section 102 (FIG. 16) with the GUI superimposition amount corresponding to a determination result for the GUI.

The GUI determination processing includes executing predetermined calculation processing, for example, on the basis of the local video information, the local contrast information, and local frequency information to determine, for each screen block, the GUI superimposition amount (for example, the ratio of the region of the GUI to the entire region of the display screen) quantitatively representing whether or not the GUI is superimposed on the screen block. Then, the effect removing moving image blur is suppressed according to the GUI superimposition amount as described above.

Note that, in this case, according to the GUI superimposition amount obtained for each screen block, the effect removing moving image blur may be suppressed for the entire display screen or for each division region in a case where the impulse driving is performed for each division region as in the second embodiment. In this case, as the division region, for example, a region corresponding to the screen block BK illustrated in FIG. 19 may be used.

As described above, in the fourth embodiment, the feature amounts of the video content are detected, and when driving of the light emitting section such as the backlight 15 (for example, the LEDs) of the liquid crystal display section 13 or the self-luminous element (for example, OLED) of the self-luminous display section 23 is controlled on the basis of corresponding detection results, control for suppressing the effect removing moving image blur is performed in a case where graphics such as the GUI are superimposed on the video. Thus, an increase in power consumption and a reduction in device life can be suppressed.

5. Fifth Embodiment

Incidentally, the self-luminous display apparatus 20 poses a problem in that the self-luminous elements (for example, the OLEDs) included in the pixels two-dimensionally arranged in the self-luminous display section 23 are locally degraded, thus degrading the display quality for videos. Here, with focus placed on an increased current applied to the self-luminous elements in pixels driven in accordance with high-luminance, high-chroma video signals, in a case where an increased current is thus applied to many pixels, local degradation of the device is inhibited by suppressing the effect removing moving image blur.

Concept of Impulse Driving

Figure 21:
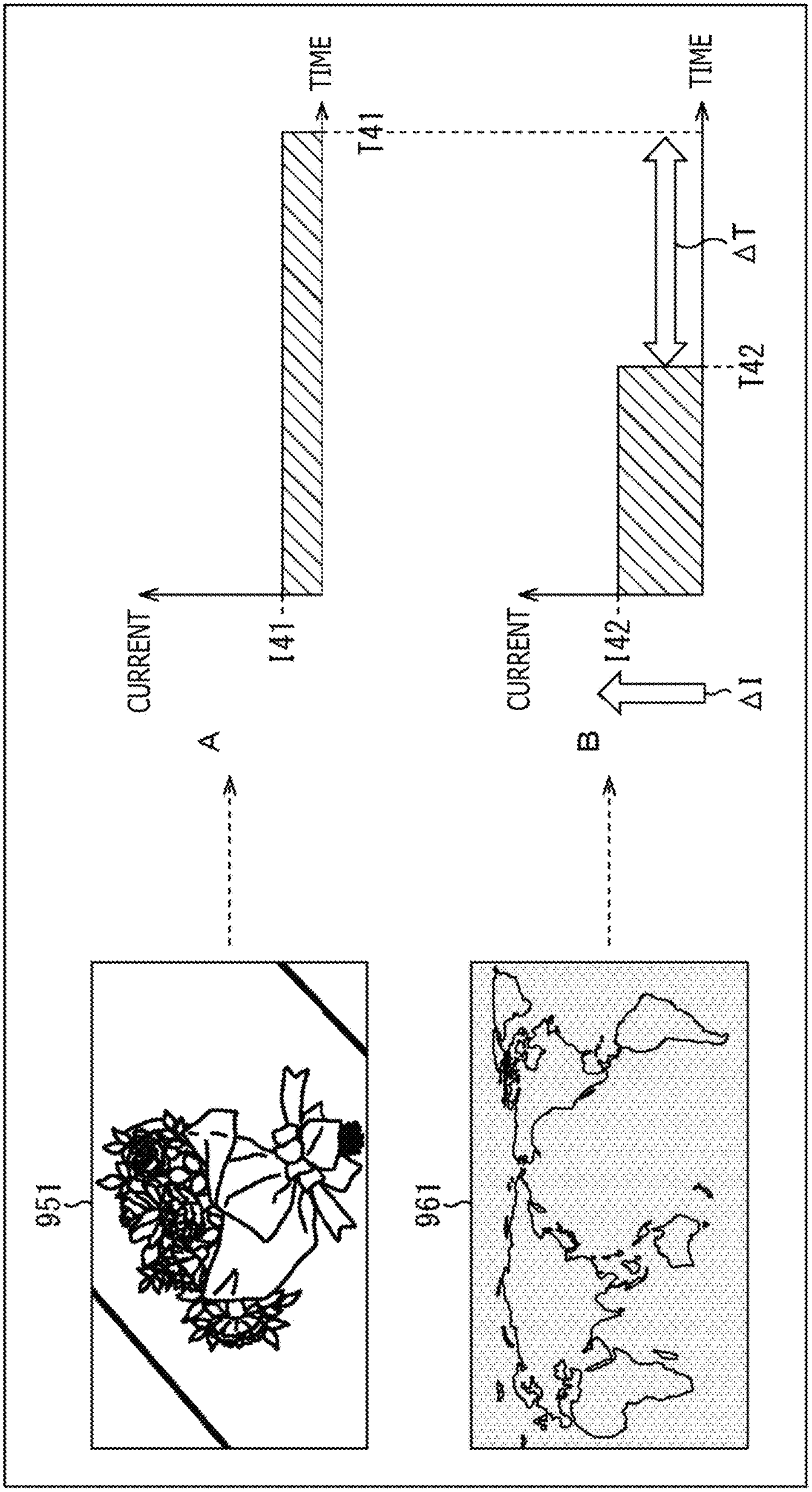
FIG. 21 is a diagram illustrating a concept of impulse driving according to a fifth embodiment.

FIG. 21 is a diagram illustrating the concept of impulse driving according to a fifth embodiment.

In FIG. 21, a video 951 and a video 961 are displayed on the self-luminous display section 23 of the self-luminous display apparatus 20.

In this case, the video 951 is a video including colorful flowers and being high both in luminance and in chroma. That is, since the video 951 is high both in luminance and in chroma, the current applied to the self-luminous elements increases to locally degrade the device, suppressing the effect removing moving image blur.

On the other hand, the video 961 is a video including a map in a dull color (fuliginous color) and being low both in luminance and in chroma. That is, since the video 961 is low both in luminance and in chroma, preventing the device from being locally degraded, suppressing the effect removing moving image blur is unnecessary.

Specifically, in the video 951 being high both in luminance and in chroma, the normal driving is performed on the basis of the driving method in A of FIG. 21. In the video 961 being low both in luminance and in chroma, the impulse driving is performed on the basis of the driving method in B of FIG. 21.

In other words, the driving method in B of FIG. 21 includes performing, at a constant current I42 (I42>I41) during an on period T42 (T42<T41), the impulse driving in which the self-luminous elements in the self-luminous display section 23 are turned on, and compared to the driving method in A of FIG. 21 (normal driving), involves a shorter on period and a corresponding longer off period, thus allowing moving image blur to be removed.

In contrast, the driving method in A of FIG. 21 suppresses the effect removing moving image blur, but compared to the driving method (impulse driving) in B of FIG. 21, reduces the magnitude of the current (I41<I42), thus allowing an increase in power consumption to be minimized. As a result, an increase in current applied to the self-luminous elements is inhibited, allowing suppression of local degradation of the device.

In the fifth embodiment, in consideration of the life of the self-luminous display section 23 (device) in which the pixels including the self-luminous elements (for example, the OLEDs) are two-dimensionally arranged, the self-luminous display apparatus 20 suppresses the effect removing moving image blur, for a pattern including many pixels having an applied current with a large current value, as described above. This enables local degradation of the device to be suppressed.

Note that, for the applied current, determination may be made on the basis of the level of current applied to the pixel (pixel level) rather than using the information related to luminance or chroma. Thus, a configuration using the information related to luminance or chroma is illustrated in FIG. 22, and a configuration using the pixel level is illustrated in FIG. 23.

Configuration of Signal Processing Section

Figure 22:
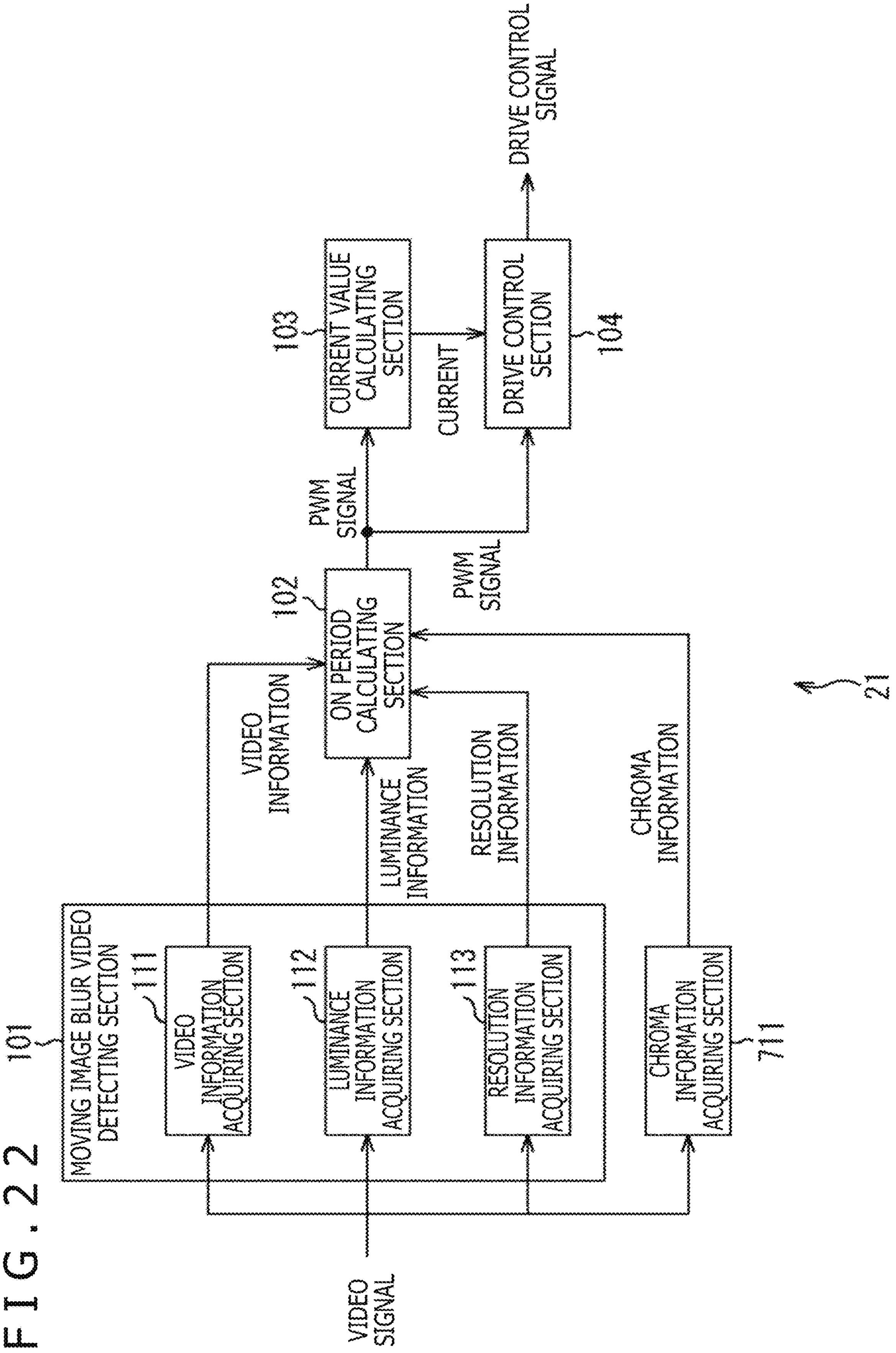
FIG. 22 is a block diagram illustrating a first example of a configuration of a signal processing section according to the fifth embodiment.
Figure 23:
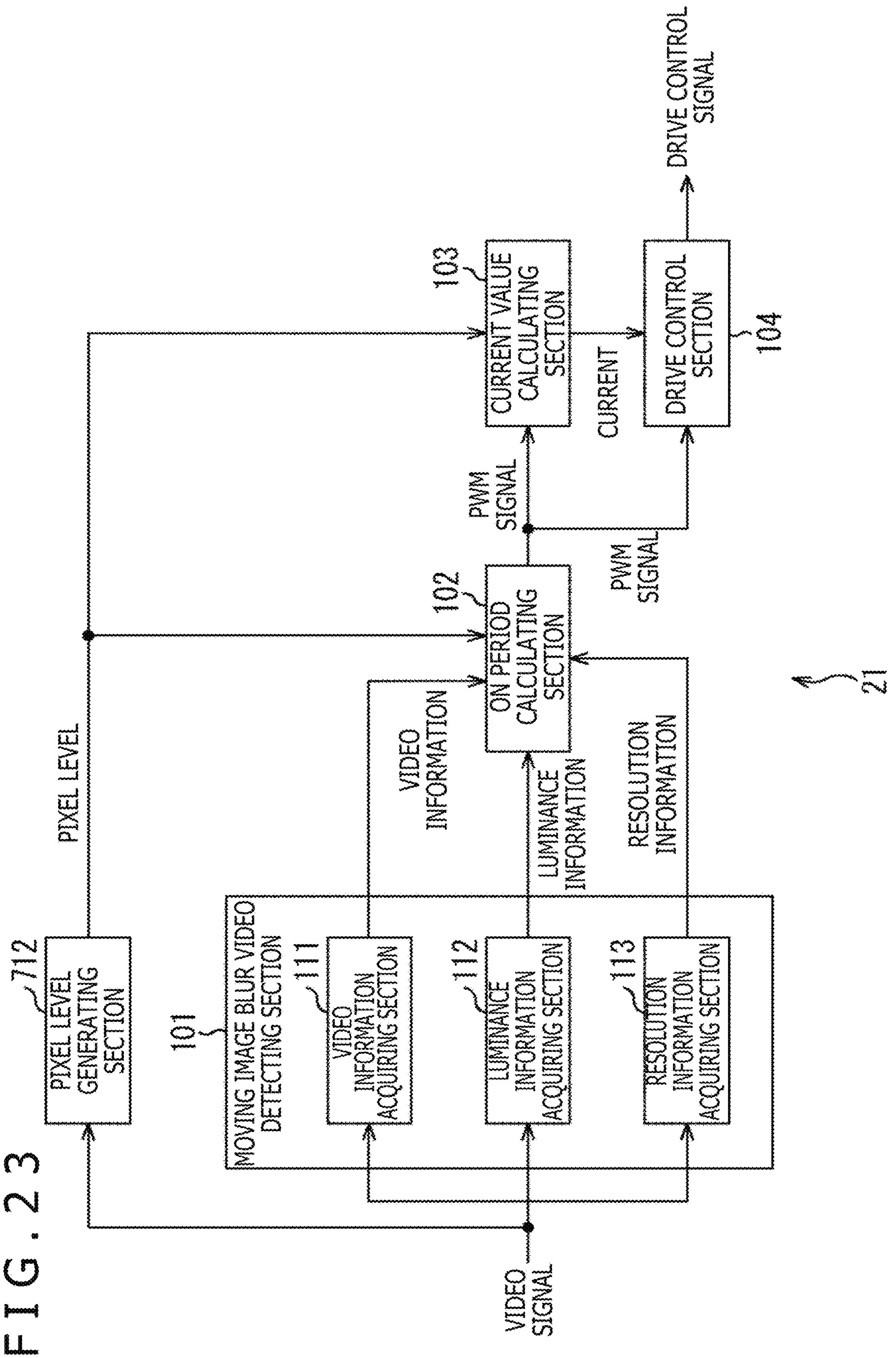
FIG. 23 is a block diagram illustrating a second example of the configuration of the signal processing section according to the fifth embodiment.

FIG. 22 is a block diagram illustrating a first example of a configuration of the signal processing section according to the fifth embodiment. Specifically, FIG. 22 illustrates a configuration of the signal processing section 21 used in a case where the information related to luminance or chroma is used.

In FIG. 22, the signal processing section 21 includes the moving image blur video detecting section 101, the on period calculating section 102, the current value calculating section 103, the driving control section 104, and a chroma information acquiring section 711. In other words, compared to the configuration of the signal processing section 11 in FIG. 4, the signal processing section 21 in FIG. 22 includes the chroma information acquiring section 711 newly added.

In the moving image blur video detecting section 101, the video information acquiring section 111, the luminance information acquiring section 112, and the resolution information acquiring section 113 acquire the video information, the luminance information, and the resolution information as described for the configuration in FIG. 4. The video information, luminance information, and resolution information detected by the moving image blur video detecting section 101 are feature amounts of the video content, and a moving image blur video is detected on the basis of these feature amounts.

The chroma information acquiring section 711 executes chroma information acquisition processing on the video signal for the video content, and feeds a corresponding processing result to the on period calculating section 102 as chroma information.

Here, the chroma information is a value indicating the vividness of the entire video, and the chroma information acquisition processing includes acquiring chroma information on the basis of chroma for each of the regions included in the video (for example, the regions corresponding to the pixels). Note that as the chroma information, for example, a statistical value (for example, a mean, a median, a mode, or a total value) for the chroma for each region may be computed.

Additionally, the luminance information used to suppress the effect removing moving image blur is acquired by the luminance information acquiring section 112, and is a value indicating a property related to the brightness of the entire video. In other words, the luminance information in this case differs from the peak luminance information described above.

As described above, the chroma information acquired by the chroma information acquiring section 711 and the luminance information acquired by the luminance information acquiring section 112 are feature amounts of the video content, and in this case, suppress the effect removing moving image blur. Specifically, in the self-luminous display apparatus 20, even in a case where a moving image blur video is detected on the basis of the feature amount such as the video information, when the number of pixels in the pattern having an applied current with a large current value is determined to be large on the basis of the luminance information and the chroma information, the effect removing moving image blur is suppressed.

The on period calculating section 102, the current value calculating section 103, and the driving control section 104 generate driving control signals (OLED driving control signals) for turning on the self-luminous elements (for example, the OLEDs) in the self-luminous display section 23 on the basis of the detection result for a moving image blur video from the moving image blur video detecting section 101, and the luminance information from the luminance information acquiring section 112 and the chroma information from the chroma information acquiring section 711 as described for the configuration in FIG. 4.

Note that FIG. 22 illustrates the configuration in which the effect removing moving image blur is suppressed in a case where the number of pixels having an applied current with a large current value is determined to be large on the basis of the luminance information and the chroma information but that it is sufficient that at least one of the luminance information or the chroma information is used. Additionally, the luminance information and the chroma information are correlated with the applied current applied to (the self-luminous element included in) the pixel, and can thus be also said to be applied current information.

Another Configuration of Signal Processing Section

FIG. 23 is a block diagram illustrating a second example of a configuration of the signal processing section according to the fifth embodiment. Specifically, FIG. 23 illustrates a configuration of the signal processing section 21 used in a case where the pixel level is used.

In FIG. 23, the signal processing section 21 includes the moving image blur video detecting section 101, the on period calculating section 102, the current value calculating section 103, the driving control section 104, and a pixel level generating section 712. In other words, compared to the configuration of the signal processing section 11 in FIG. 4, the signal processing section 21 in FIG. 23 includes the pixel level generating section 712 newly added.

In the moving image blur video detecting section 101, the video information acquiring section 111, the luminance information acquiring section 112, and the resolution information acquiring section 113 acquire the video information, the luminance information, and as described for the configuration in FIG. 4.

The pixel level generating section 712 executes pixel level generation processing on the video signal for the video content, and feeds a corresponding processing result to the on period calculating section 102 and the current value calculating section 103 as the pixel level.

In the pixel level generation processing, for example, in a case where each pixel has an RGBW four-color pixel structure in which each pixel includes subpixels for RGB three primary colors and a white (W) subpixel, a level corresponding to an RGBW signal is generated for each pixel. Additionally, the pixel level is correlated with the applied current applied to (the self-luminous element included in) the pixel, and can thus be also said to be applied current information related to the applied current.

The on period calculating section 102, the current value calculating section 103, and the driving control section 104 generate driving control signals (OLED driving control signals) for turning on the self-luminous elements (for example, the OLEDs) in the self-luminous display section 23 on the basis of the detection result for a moving image blur video from the moving image blur video detecting section 101 and the pixel level from the pixel level generating section 712.

Flow of Impulse Driving Determination Processing

Figure 24:
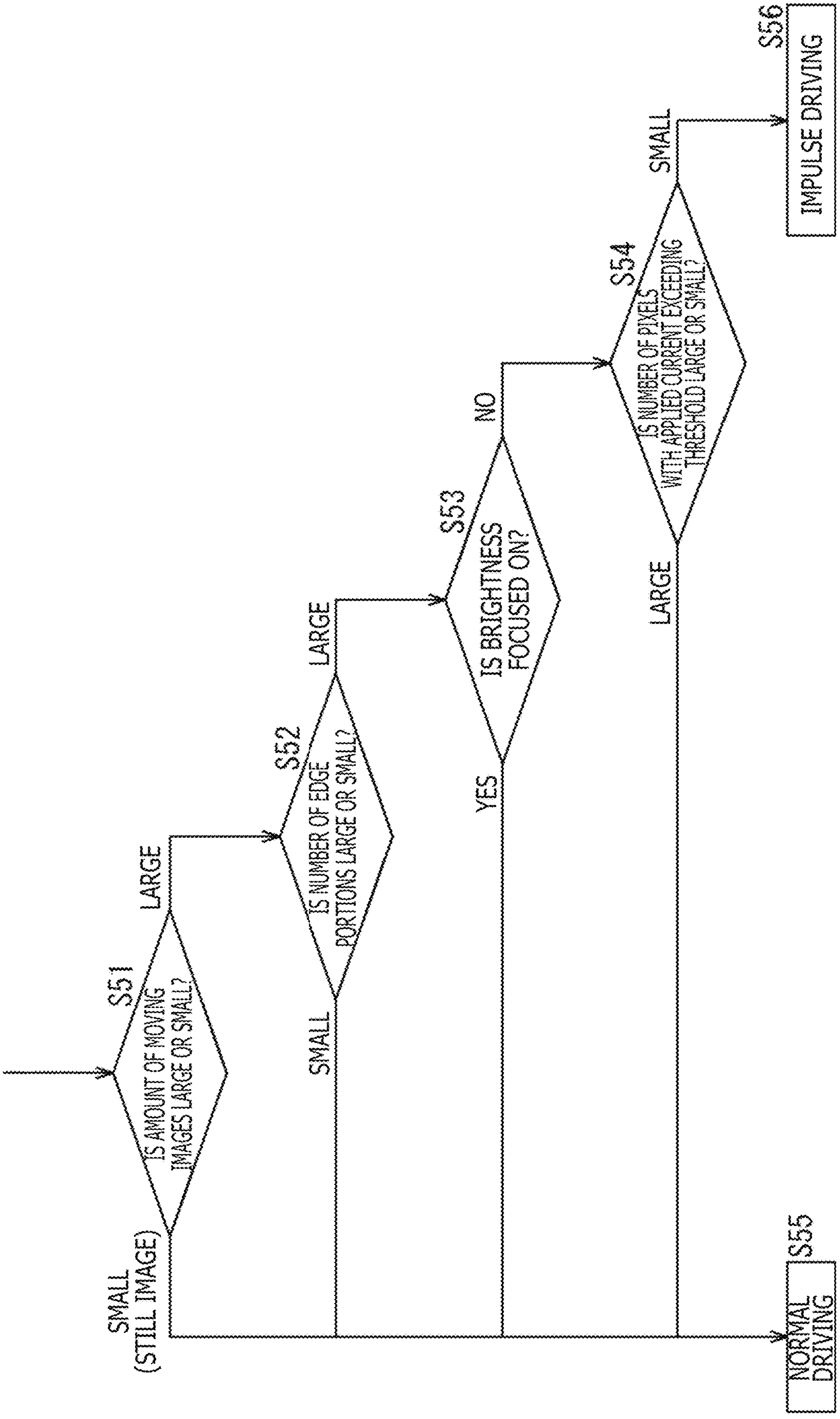
FIG. 24 is a flowchart illustrating impulse driving determination processing according to the fifth embodiment.

Now, with reference to a flowchart in FIG. 24, a flow of impulse driving determination processing will be described that is executed by the signal processing section according to the fifth embodiment.

In steps SM to S53, as is the case with steps S11 to S13 in FIG. 7, in a case where the moving image amount is determined to be small in the determination processing in step SM, in a case where the number of edge portions is determined to be small in the determination processing in step S52, or in a case where driving with brightness focused on is determined to be performed in the determination processing in step S53, then the processing is advanced to step S55 to perform the normal driving (S55).

Additionally, in a case where, after the moving image amount is determined to be large in the determination processing in step SM, the number of edge portions is determined to be large in the determination processing in step S52 and further driving with brightness not focused on is determined to be performed in the determination processing in step S53, then the processing is advanced to step S54.

In step S54, the signal processing section 21 determines whether or not the number of pixels having an applied current larger than a threshold is large.

In the determination processing in step S54, by comparing a preset threshold for applied current determination with the luminance information acquired by the luminance information acquiring section 112 (FIG. 22) and the applied current identified from the chroma information acquired by the chroma information acquiring section 711 (FIG. 22), whether or not the number of pixels having an applied current larger than the threshold may be determined. Additionally, in the determination processing in step S54, by comparing a preset threshold for applied current determination with the applied current corresponding to the pixel level generated by the pixel level generating section 712 (FIG. 23), whether or not the applied current is larger than the threshold may be determined.

In a case where, in step S54, the number of pixels with an applied current larger than the threshold is determined to be large, the processing is advanced to step S55. In step S55, the signal processing section 21 causes the self-luminous elements in the self-luminous display section 23 to be driven on the basis of the normal driving. A case where the normal driving is performed is assumed to be, for example, a case where a video including a colorful object is displayed.

Additionally, in step S54, in a case where the number of pixels having an applied current larger than the threshold is determined to be small, the processing is advanced to step S56. In step S56, the signal processing section 21 causes the self-luminous elements in the self-luminous display section 23 to be driven on the basis of the impulse driving. A case where the impulse driving is performed is assumed to be, for example, a case where a video including an object in a dull color is displayed.

The flow of the impulse driving determination processing has been described above. Note that the order of the steps of determination processing (SM, S52, S53, and S54) in the impulse driving determination processing in FIG. 24 is optional, and not all of the steps of determination processing need to be executed. Additionally, an appropriate value can be set for the threshold for determination according to various conditions.

As described above, in the fifth embodiment, when the feature amounts of the video content are detected, and on the basis of the detection results, the driving of the self-luminous elements (for example, the OLEDs) in the self-luminous display section 23 is controlled, in a case where the applied current to the self-luminous elements increases, control is performed in which the effect removing moving image blur is suppressed. Therefore, the self-luminous display apparatus 20 enables local degradation of the device to be suppressed in the self-luminous display section 23.

6. Configuration of Display Apparatus

FIG. 25 is a diagram illustrating an example of a detailed configuration of a liquid crystal display apparatus to which the present technology is applied.

The CPU 1000 operates as a central processing apparatus in a liquid crystal display apparatus 10, for various calculation processing and operation control for each section.

Additionally, the CPU 1000 is connected to, for example, a short-range radio communication module or an infrared communication module not illustrated. The CPU 1000 receives an operation signal transmitted from a remote controller (not illustrated) in accordance with an operation of the viewer/listener, and controls the operation of each section in accordance with the received operation signal. Note that as the short-range radio communication, communication complying with Bluetooth (registered trademark) is performed.

For example, in a case where the viewer/listener operates a remote controller to make desired settings, then under the control of the CPU 1000, a GUI (graphics) such as a setting menu corresponding to the operation signal from the remote controller is displayed on the liquid crystal display section 13. Additionally, at this time, the CPU 1000 can feed (the signal processing section 11 (FIG. 17) of) a driving section 1003 with the GUI superimposition amount (graphic amount) related to the GUI such as the setting menu and stored in a memory not illustrated. Note that GUI information, for example, the GUI superimposition amount (for example, the size) of the GUI is pre-stored in the memory.

A power supply section 1001 is connected to an external AC power supply, converts the received AC power supply into a DC power supply with a predetermined voltage, and provides the DC power supply to a DC/DC converter 1002. The DC/DC converter 1002 DC/DC-converts a power supply voltage supplied from the power supply section 1001, and supplies the power voltage converted to different sections including the driving section 1003 and a system on chip 1013. The power supply voltage supplied to the different sections may vary with the section or may be the same.

On the basis of a video signal fed from the system on chip 1013, the driving section 1003 drives the liquid crystal display section 13 and the backlight 15 to cause the liquid crystal display section 13 and the backlight 15 to display the video. Note that the driving section 1003 corresponds to the signal processing section 11, display driving section 12, and backlight driving section 14 illustrated in FIG. 1.

HDMI terminals 1004-1 to 1004-3 each transmit and receive signals complying with HDMI (registered trademark) (High Definition Multimedia Interface) standards, to and from external equipment (for example, a player for optical disc reproduction) to which the terminal is connected. On the basis of a control signal complying with the HDMI standards, an HDMI switch 1005 appropriately switches the HDMI terminals 1004-1 to 1004-3 to relay an HDMI signal between the system on chip 1013 and the external equipment connected to the HDMI terminals 1004-1 to 1004-3.

An analog AV input terminal 1006 causes an analog AV (Audio and Visual) signal from the external equipment to be input and fed to the system on chip 1013. An analog sound output terminal 1007 outputs an analog sound signal fed from the system on chip 1013 to external equipment to which the system on chip 1013 is connected.

A USB (Universal Serial Bus) terminal input section 1008 is a connector to which a USB terminal is connected. For example, a storage apparatus such as a semiconductor memory or an HDD (Hard Disk Drive) is connected to the USB terminal input section 1008 as an external apparatus to transmit and receive signals complying with the USB standards to and from the system on chip 1013.

A tuner 1009 is connected to an antenna (not illustrated) via an antenna terminal 1010, and acquires a broadcast signal of a predetermined channel from a radio wave received by the antenna and feeds the broad cast signal to the system on chip 1013. Note that the radio wave received by the tuner 1009 is, for example, a broadcast signal for terrestrial digital broadcasting.

A B-CAS (registered trademark) card 1012 in which an encryption key for unscrambling the terrestrial digital broadcasting is stored is inserted into a CAS card I/F 1011. The CAS card I/F 1011 reads the encryption key stored in the B-CAS card 1012 and feeds the encryption key to the system on chip 1013.

The system on chip 1013 executes processing, for example, processing for an A/D (Analog to Digital) conversion of video signals and sound signals, unscramble processing, and decode processing on broadcast signals.

An audio amplifier 1014 amplifies an analog sound signal fed from the system on chip 1013, and feeds the analog sound signal amplified to a speaker 1015. The speaker 1015 outputs a sound corresponding to the analog sound signal from the audio amplifier 1014.

A communication section 1016 is configured as a communication module supporting radio communication for radio LAN (Local Area Network), wired communication for Ethernet (registered trademark), or cellular-based communication (for example, LTE-Advanced or 5G). The communication section 1016 connects to external equipment, a server, and the like via a network such as a home network or the Internet to transmit and receive various data to and from the system on chip 1013.

Note that the configuration of the liquid crystal display apparatus 10 illustrated in FIG. 25 is illustrative and may include, for example, a camera section including a signal processing section such as an image sensor and a camera ISP (Image Signal Processor), and a sensor section including various sensors that perform sensing for obtaining various information related to surroundings. Additionally, the liquid crystal display apparatus 10 is provided with, as the liquid crystal display section 13, a liquid crystal display section with a touch panel superimposed on a screen of the liquid crystal display section, or physical buttons.

Additionally, in FIG. 25, the configuration of the liquid crystal display apparatus 10 has been described, but the description corresponds to the configuration of the self-luminous display apparatus 20 in a case where the driving section 1003 is provided to correspond to the signal processing section 21 and the display driving section 22, with the self-luminous display section 23 provided instead of the liquid crystal display section 13 and the backlight 15.

7. Modified Example

In the above-described description, the signal processing section 11 has been described as being included in the liquid crystal display apparatus 10, but the signal processing section 11 can be considered as an independent apparatus and configured as a signal processing apparatus 11 including the moving image blur video detecting section 101, the on period calculating section 102, the current value calculating section 103, and the driving control section 104. In that case, in the above description, the "signal processing section 11" may be replaced with the "signal processing apparatus 11."

Similarly, the signal processing section 21 has been described as being included in the self-luminous display apparatus 20, but the signal processing section 21 can be considered as an independent apparatus and configured as a signal processing apparatus 21. In that case, in the above description, the "signal processing section 21" may be replaced with the "signal processing apparatus 21."

Additionally, the electronic equipment using the liquid crystal display apparatus 10 or the self-luminous display apparatus 20 may be, for example, a television receiver, a display apparatus, a personal computer, a tablet type computer, a smartphone, a cellular phone, a digital camera, a head-mounted display, or a game machine, but no such limitation is intended.

For example, the liquid crystal display apparatus 10 or the self-luminous display apparatus 20 may be used as a display section of in-vehicle equipment such as car navigation or a rear seat monitor or wearable equipment such as a watch type or an eyeglass type. Note that the display apparatus includes, for example, a medical monitor, a broadcasting monitor, or a display for digital signage.

Additionally, the video contents include various contents, for example, broadcast contents transmitted by territorial broadcasting, satellite broadcasting, or the like, communication contents streamed via a communication network such as the Internet, and recorded contents recorded in a recording medium such as an optical disc or a semiconductor memory.

Note that a plurality of pixels is two-dimensionally arranged in the liquid crystal display section 13 of the liquid crystal display apparatus 10 and the self-luminous display section 23 of the self-luminous display apparatus 20 but that the pixel arrangement structure is not limited to a specific pixel arrangement structure. For example, besides pixels including RGB three-primary-color subpixels, the pixel arrangement structure may be an RGBW four-color pixel structure including RGB three-primary-color subpixels and a white (W) subpixel or an RGBY four-color pixel structure including RGB three-primary-color subpixels and a yellow (Y) subpixel.

Additionally, in the above description, the liquid crystal display section 13 and the self-luminous display section 23 have been described, but no limitation to those display sections is imposed. The present configuration may be used for any other display section, for example, an MEMS (Micro Electro Mechanical Systems) display including a TFT (Thin Film Transistor) substrate on which an MEMS shutter is driven.

Furthermore, as the type of the backlight 15 of the liquid crystal display section 13, for example, a direct type or an edge light type (light guide plate type) may be adopted. Here, in a case where the direct type is adopted as the type of the backlight 15, not only may the partial driving (driving in units of blocks) be used that is performed by the partial light emitting section 151 illustrated in FIG. 5 and FIG. 6 described above but, for example, the light emitting elements such as LEDs may also be independently driven. Additionally, for the edge light type, the backlight 15 can be applied to a type in which a plurality of light guide plates is layered.

Note that the embodiments of the present technology are not limited to the above-described embodiments and that various changes may be made to the embodiments without departing from the spirits of the present invention. For example, as a detection method for the feature amounts detected by the moving image blur video detecting section 101 and a detection method for the GUI detected by the GUI detecting section 611, well-known techniques can be used to apply various detection methods.

Additionally, the present technology can be configured as follows.

(1) A signal processing apparatus including:

a detection section detecting a moving image blur video including a video in which moving image blur is easily visible, from videos included in a video content on a basis of a feature amount of the video content.

(2) The signal processing apparatus according to (1), further including:

a control section controlling driving of a light emitting section of a display section displaying videos of the video content on a basis of a detection result from the moving image blur video detected.

(3) The signal processing apparatus according to (2), in which one or a plurality of the detection sections is provided, and the control section executes control to perform impulse type driving on the light emitting section according to a degree of easiness with which the moving image blur video detected by the one or plurality of the detection sections is visible.

(4) The signal processing apparatus according to (3), in which the feature amount includes a moving image amount indicating movement of an object included in the videos of the video content, and the detection section detects the moving image amount from the video content.

(5) The signal processing apparatus according to (3) or (4), in which the feature amount includes an edge amount indicating an edge portion included in the videos of the video content, and the detection section detects the edge amount from the video content.

(6) The signal processing apparatus according to any one of (3) to (5), in which the feature amount includes luminance information indicating luminance of the videos of the video content, and the detection section detects the luminance information from the video content.

(7) The signal processing apparatus according to any one of (4) to (6), in which the control section executes control to perform the impulse type driving on the light emitting section in a case where the moving image amount detected is larger than a threshold.

(8) The signal processing apparatus according to any one of (4) to (7), in which the control section executes control to perform the impulse type driving on the light emitting section in a case where the edge amount detected is larger than a threshold.

(9) The signal processing apparatus according to (7) or (8), in which the control section executes control to perform the impulse type driving on the light emitting section in a case where the video does not focus on a peak luminance.

(10) The signal processing apparatus according to any one of (3) to (9), in which the control section controls, during the impulse type driving, driving of the light emitting section to make an on period shorter and a current larger than during normal driving.

(11) The signal processing apparatus according to any one of (2) to (10), in which the detection section detects the moving image blur video in each of division regions into which a region of the videos of the video content is divided, and the control section controls driving of the light emitting section for each of the division regions on a basis of a detection result for the moving image blur video in each of the division regions.

(12) The signal processing apparatus according to (11), in which the control section controls driving of the light emitting section on a basis of a detection result for the moving image blur video for an entire region in the videos of the video content and a detection result for the moving image blur video for each of division regions.

(13) The signal processing apparatus according to any one of (3) to (9), in which the feature amount includes a graphic amount of graphics included in the videos of the video content.

(14) The signal processing apparatus according to (13), in which the control section suppresses the impulse type driving performed on the light emitting section in a case where the graphic amount is larger than a threshold.

(15) The signal processing apparatus according to any one of (3) to (12), in which the display section includes a liquid crystal display section, the light emitting section includes a backlight provided for the liquid crystal display section, and the control section controls an on period and a current value for the backlight according to a degree of easiness with which the moving image blur video is visible.

(16) The signal processing apparatus according to (15), in which the liquid crystal display section includes a plurality of partial display regions into which a display screen is divided, the backlight includes a plurality of partial light emitting sections corresponding to the partial display regions, and the control section executes control to perform the impulse type driving on the partial light emitting section in a case where the video does not focus on a peak luminance.

(17) The signal processing apparatus according to (15) or (16), in which the backlight includes a light emitting diode backlight for which a KSF fluorescent substance is adopted, and the control section controls the light emitting diode backlight to provide a period of turn-on corresponding to a degree of an afterimage caused by a delayed response for red.

(18) The signal processing apparatus according to (17), in which the control section determines a degree of an afterimage included in the videos of the video content on a basis of a detection result for visibility of the afterimage, and controls a period for turn-on of the LED backlight to reduce the afterimage according to a corresponding determination result.

(19) The signal processing apparatus according to (3) to (12), in which the display section includes a self-luminous display section, the light emitting section includes self-luminous elements, the self-luminous elements are provided for subpixels included in pixels two-dimensionally arranged in the self-luminous display section, and the control section controls an on period and a current value for the self-luminous display elements according to the degree of easiness with which the moving image blur video is visible.

(20) The signal processing apparatus according to (19), in which the control section controls driving of the light emitting section on a basis of applied image information related to an applied current applied to the pixels.

(21) The signal processing apparatus according to (20), in which the control section suppresses the impulse type driving performed on the light emitting section in a case where the pixels for which the applied current is larger than a threshold satisfy a predetermined condition.

(22) A signal processing method for a signal processing apparatus, in which the signal processing apparatus detects a moving image blur video including a video in which moving image blur is easily visible, from videos included in a video content on a basis of a feature amount of the video content.

(23) A display apparatus including:

a display section displaying videos of a video content;

a detection section detecting a moving image blur video including a video in which moving image blur is easily visible, from videos included in a video content on a basis of a feature amount of the video content; and a control section controlling driving of a light emitting section of the display section on a basis of a detection result for the moving image blur video detected.

REFERENCE SIGNS LIST

10 Liquid crystal display apparatus, 11 Signal processing section, 12 Display driving section, 13 Liquid crystal display section, 14 Backlight driving section, 15 Backlight, 15A LED backlight, 20 Self-luminous display apparatus, 21 Signal processing section, 22 Display driving section, 23 Self-luminous display section, 101 Moving image blur video detecting section, 102 On period calculating section, 103 Current value calculating section, 104 Driving control section, 111 Video information acquiring section, 112 Luminance information acquiring section, 113 Resolution information acquiring section, 151, 151A, 151B Partial light emitting section, 201 Moving image blur video detecting section, 211 Video region dividing section, 301 Video information acquiring section, 303 BL driving control section, 311 Video information acquiring section, 312 On period calculating section, 611 GUI detecting section, 621 Local video information acquiring section, 622 Local contrast information acquiring section, 623 Local frequency information acquiring section, 624 GUI determining section, 711 Chroma information acquiring section, 712 Pixel level generating section, 1000 CPU, 1003 Driving section

The invention claimed is:

1. A display apparatus comprising:

a display having a light emitting section including a plurality of light emitting elements; and circuitry configured to:

detect a feature amount of a video content;

control driving of the light emitting section of the display displaying the video content; and control an on period and a current value for at least one of the plurality of light emitting elements in the light emitting section based on the feature amount of the video content, wherein the on period for the at least one of the plurality of light emitting elements in the light emitting section is controlled by changing a driving frequency for impulse driving based on the feature amount of the video content, and wherein integration of brightness of the at least one of the plurality of light emitting elements in the light emitting section is substantially the same before and after a change in driving frequency, wherein the display includes a self-luminous display section, the plurality of light emitting elements in the light emitting section includes self-luminous elements, the self-luminous elements are provided for subpixels included in pixels two-dimensionally arranged in the self-luminous display section, the circuitry is configured to control the on period and the current value for the self-luminous elements, and the circuitry is configured to suppress the impulse driving performed on the light emitting section in a case where the pixels, for which the applied current is larger than a threshold, satisfy a condition.

2. The display apparatus according to claim 1, wherein the feature amount includes at least one of video information, luminance information or resolution information of the video content.

3. The display apparatus according to claim 1, wherein the circuitry is configured to perform the impulse driving when the video content is low in luminance, and perform a normal driving when the video content is high in luminance.

4. The display apparatus according to claim 3, wherein the circuitry is configured to control, during the impulse driving, the on period to be shorter and the current value to be larger than during the normal driving.

5. The display apparatus according to claim 1, wherein the circuitry is configured to gradually change the driving frequency.

6. The display apparatus according to claim 1, wherein the circuitry is configured to control driving of the light emitting section on a basis of applied current information related to a current applied to pixels.

7. The display apparatus according to claim 1, wherein the display apparatus is a television receiver.

8. A display apparatus comprising:

a display having a light emitting section including a plurality of light emitting elements; and circuitry configured to:

detect a feature amount of a video content;

control driving of the light emitting section of the display displaying the video content; and control an on period and a current value for at least one of the plurality of light emitting elements in the light emitting section based on the feature amount of the video content, wherein the on period for the at least one of the plurality of light emitting elements in the light emitting section is controlled by changing a driving frequency for impulse driving based on the feature amount of the video content, and wherein the circuitry is configured to control the on period before a change in driving frequency to be substantially equal to the on period after the change in driving frequency, wherein the display includes a self-luminous display section, the plurality of light emitting elements in the light emitting section includes self-luminous elements, the self-luminous elements are provided for subpixels included in pixels two-dimensionally arranged in the self-luminous display section, the circuitry is configured to control the on period and the current value for the self-luminous elements, and the circuitry is configured to suppress the impulse driving performed on the light emitting section in a case where the pixels, for which the applied current is larger than a threshold, satisfy a condition.

9. A display apparatus comprising:

a display having a light emitting section including a plurality of light emitting elements; and circuitry configured to:

detect a feature amount of a video content;

control driving of the light emitting section of the display displaying the video content; and control an on period and a current value for at least one of the plurality of light emitting elements in the light emitting section based on the feature amount of the video content, wherein the on period for the at least one of the plurality of light emitting elements in the light emitting section is controlled by changing a driving frequency for impulse driving based on the feature amount of the video content, and wherein the feature amount includes a graphic amount of a graphic displayed on the display, and the circuitry is configured to suppress the impulse driving performed on the light emitting section in a case where the graphic amount is larger than a threshold.

10. The display apparatus according to claim 9, wherein the display includes a liquid crystal display section, and the light emitting section includes a backlight provided for the liquid crystal display section.

11. The display apparatus according to claim 10, wherein the liquid crystal display section includes a plurality of partial display regions into which a display screen is divided, the backlight includes a plurality of partial light emitting sections corresponding to the plurality of partial display regions, and the circuitry is configured to perform the impulse driving on the partial light emitting sections.

12. The display apparatus according to claim 10, wherein the circuitry is configured to determine a degree of an afterimage included in each video of the video content on a basis of a detection result for visibility of the afterimage, and control a period for turn-on of the backlight to reduce the afterimage according to a corresponding determination result.

13. The display apparatus according to claim 9, wherein the graphic amount includes a Graphical User Interface (GUI) superimposition amount.

14. The display apparatus according to claim 9, wherein the graphic amount includes a setting menu superimposition amount.

15. A display apparatus comprising:

a display having a light emitting section including a backlight, the backlight including a plurality of light emitting elements; and circuitry configured to:

detect a feature amount of a video content;

control driving of the light emitting section of the display displaying the video content; and control an on period and a current value for at least one of the plurality of light emitting elements in the light emitting section based on the feature amount of the video content, wherein the on period for the at least one of the plurality of light emitting elements in the light emitting section is controlled by changing a driving frequency for impulse driving based on the feature amount of the video content, and wherein the backlight includes a light emitting diode backlight for which a KSF fluorescent substance is adopted, and the circuitry is configured to control the light emitting diode backlight to provide a period of turn-on corresponding to a degree of an afterimage caused by a delayed response for red light emitting elements, wherein the feature amount includes a graphic amount of a graphic displayed on the display, and the circuitry is configured to suppress the impulse driving performed on the light emitting section in a case where the graphic amount is larger than a threshold.

16. A television receiver comprising:

a display having a light emitting section including a plurality of light emitting elements; and circuitry configured to:

detect a feature amount of a video content;

control driving of the light emitting section of the display displaying the video content; and control an on period and a current value for at least one of the plurality of light emitting elements in the light emitting section based on the feature amount of the video content, wherein the on period for the at least one of the plurality of light emitting elements in the light emitting section is controlled by changing a driving frequency for impulse driving based on the feature amount of the video content, and wherein integration of brightness of the at least one of the plurality of light emitting elements in the light emitting section is substantially the same before and after the change in driving frequency wherein the display includes a self-luminous display section, the plurality of light emitting elements in the light emitting section includes self-luminous elements, the self-luminous elements are provided for subpixels included in pixels two-dimensionally arranged in the self-luminous display section, the circuitry is configured to control the on period and the current value for the self-luminous elements, and the circuitry is configured to suppress the impulse driving performed on the light emitting section in a case where the pixels, for which the applied current is larger than a threshold, satisfy a condition.

17. The television receiver according to claim 16, wherein the feature amount includes at least one of video information, luminance information or resolution information of the video content.

18. The television receiver according to claim 16, wherein the circuitry is configured to perform the impulse driving when the video content is low in luminance, and perform normal driving when the video content is high in luminance.

* * * * *